United States Patent [19]
Cotte et al.

[11] Patent Number: 5,499,108
[45] Date of Patent: Mar. 12, 1996

[54] DOCUMENT-DRIVEN SCANNING INPUT DEVICE COMMUNICATING WITH A COMPUTER

[75] Inventors: Pierre Cotte, Paris, France; Ronald C. Fish, Morgan Hill, Calif.

[73] Assignee: Visioneer Communications, Inc., Palo Alto, Calif.

[21] Appl. No.: 988,404

[22] Filed: Dec. 9, 1992

Related U.S. Application Data

[63] Continuation-in-part of Ser. No. 922,169, Jul. 29, 1992.
[51] Int. Cl.⁶ .............................. H04N 1/00; G05B 13/02
[52] U.S. Cl. ........................ 358/400; 358/448; 358/498; 364/181; 345/902
[58] Field of Search .................................. 358/400, 402, 358/426, 439, 401, 444, 494, 496, 498, 448; 364/181, 238.3, 241.2, 242.1, 927.99; 345/902

[56] References Cited

U.S. PATENT DOCUMENTS

D. 285,564  9/1986  Bevilacqua et al. .

(List continued on next page.)

FOREIGN PATENT DOCUMENTS

| | | |
|---|---|---|
| 0159158 | 10/1985 | European Pat. Off. . |
| 0358441 | 3/1990 | European Pat. Off. . |
| 0398185 | 11/1990 | European Pat. Off. . |
| 0426412 | 5/1991 | European Pat. Off. . |
| 0478340 | 4/1992 | European Pat. Off. . |
| 0556067 | 8/1993 | European Pat. Off. . |
| 57-129578 | 8/1982 | Japan . |

(List continued on next page.)

*Primary Examiner*—Edward L. Coles, Sr.
*Assistant Examiner*—Madeleine Nguyen
*Attorney, Agent, or Firm*—Thomas A. Gallagher

[57] ABSTRACT

An integral input/computer component combination is disclosed wherein a input device may share a single data port on the host computer with a Fax modem and be mounted to a monitor, printer, keyboard etc. so as to have a small footprint. A pair of UARTS coupled to a a microprocessor in the input device implements a passthrough connection from the port of the input device coupled to the data port of the host to a data port of the input device coupled to the Fax modem whenever the input device using scanning technology is not in use. A relay makes the same passthrough connection whenever power is turned off to the input device. In one zero footprint embodiment, the input device input device has snap-in projections which are pushed into slots formed in the computer component housing to lock the input device into place. In another embodiment, the input device and computer component are mounted together by specially adapted brackets to adjust for differences in housing dimensions between the input device and the computer component. In some embodiments, the input device and computer component share a common element such as a paper tray. In other embodiments, the input device is completely enclosed by the computer component housing. In any of these embodiments, the input device and computer component can have separate power and data lines, or, alternatively, can share power and data lines such as by having the input device derive its power from the power supply of the computer component and time division multiplexing of the data cable of said computer component. In the preferred embodiment, the software of the input device can recognize special symbols placed on the document which represents commands the user desires to give to the host computer to control its operations to process the scanned image. In the preferred embodiment, these symbols are placed on the document with different stickers, which may be different for each command or which may be universal and contain boxes the user can darken to indicate the desired command and the parameters needed by the host carry out that command. In other embodiments, the symbols may be drawn or preprinted on the document to be scanned or printed on the document by software which stores different graphic image symbols and which can print them on the document using a laser printer etc.

50 Claims, 15 Drawing Sheets

U.S. PATENT DOCUMENTS

| | | | |
|---|---|---|---|
| 4,034,209 | 7/1977 | Kashio | 235/433 |
| 4,043,665 | 8/1977 | Caldwell | 355/76 |
| 4,132,401 | 1/1979 | Gauronski et al. | 271/245 |
| 4,205,780 | 6/1980 | Burns et al. | 235/454 |
| 4,283,621 | 8/1981 | Pembroke | 235/375 |
| 4,323,773 | 4/1982 | Carpenter | 235/473 |
| 4,410,945 | 10/1983 | Merdan | 382/182 |
| 4,415,981 | 11/1983 | Cutter et al. | 395/106 |
| 4,504,969 | 3/1985 | Suzuki et al. | 382/175 |
| 4,525,788 | 6/1985 | Gottlieb et al. | 364/478 |
| 4,548,401 | 10/1985 | Nishikawa | 271/265.01 |
| 4,558,373 | 12/1985 | Plasencia et al. | 358/484 |
| 4,563,706 | 1/1986 | Nagashima | 358/444 |
| 4,574,395 | 3/1986 | Kato | 382/306 |
| 4,631,598 | 12/1986 | Burkhardt et al. | 358/425 |
| 4,680,674 | 7/1987 | Moore | 361/686 |
| 4,743,974 | 5/1988 | Lockwood | 358/494 |
| 4,760,458 | 7/1988 | Watanabe et al. | 358/452 |
| 4,760,606 | 7/1988 | Lesnick et al. | 382/306 |
| 4,770,403 | 7/1988 | Akio | 271/110 |
| 4,802,204 | 1/1989 | Chang | 358/400 |
| 4,815,029 | 3/1989 | Barker et al. | 395/146 |
| 4,860,112 | 8/1989 | Nichols et al. | 358/400 |
| 4,868,672 | 9/1989 | Hiroki et al. | 358/494 |
| 4,885,704 | 12/1989 | Takagi et al. | 345/166 |
| 4,918,540 | 4/1990 | Ohtani | 358/429 |
| 4,918,588 | 4/1990 | Barrett et al. | 395/600 |
| 4,937,439 | 6/1990 | Wanninger et al. | 235/456 |
| 4,944,031 | 7/1990 | Yoshino | 355/206 |
| 4,972,273 | 11/1990 | Burkhardt et al. | 358/443 |
| 4,982,293 | 1/1991 | Ishii | 358/429 |
| 4,996,707 | 2/1991 | O'Malley et al. | 379/100 |
| 5,019,916 | 5/1991 | Ogura | 358/401 |
| 5,021,640 | 6/1991 | Muroi | 235/462 |
| 5,038,158 | 8/1991 | Ayers et al. | 346/153.1 |
| 5,060,135 | 10/1991 | Levine et al. | 395/155 |
| 5,062,058 | 10/1991 | Morikawa | 395/131 |
| 5,062,136 | 10/1991 | Gattis et al. | 358/426 |
| 5,072,923 | 12/1991 | Coy | 271/110 |
| 5,115,326 | 5/1992 | Burgess et al. | 358/440 |
| 5,191,622 | 3/1993 | Shojima et al. | 382/185 |
| 5,199,063 | 3/1993 | Erickson et al. | 358/400 |
| 5,208,873 | 5/1993 | Nakajima | 382/282 |
| 5,216,517 | 6/1993 | Kinoshita et al. | 358/400 |
| 5,227,893 | 7/1993 | Ett | 358/400 |
| 5,235,674 | 8/1993 | Cohen-Skalli et al. | 395/101 |
| 5,243,437 | 9/1993 | Millman et al. | 358/400 |
| 5,245,446 | 9/1993 | Takayanagi | 358/400 |
| 5,267,058 | 11/1993 | Sata | 358/498 |
| 5,267,059 | 11/1993 | Kawabata et al. | 358/498 |
| 5,267,303 | 11/1993 | Johnson et al. | 358/468 |
| 5,282,052 | 1/1994 | Johnson et al. | 358/402 |
| 5,289,570 | 2/1994 | Suzuki | 358/452 |
| 5,325,297 | 6/1994 | Bird et al. | 364/419.07 |
| 5,332,207 | 7/1994 | Oonishi et al. | 271/110 |
| 5,420,697 | 5/1995 | Tuli | 358/472 |

FOREIGN PATENT DOCUMENTS

| | | |
|---|---|---|
| 0250430 | 12/1985 | Japan . |
| 62-183255 | 8/1987 | Japan . |
| 03013052 | 1/1991 | Japan . |
| WO9110969 | 7/1991 | WIPO . |
| WO9203884 | 3/1992 | WIPO . |
| WO9207440 | 4/1992 | WIPO . |

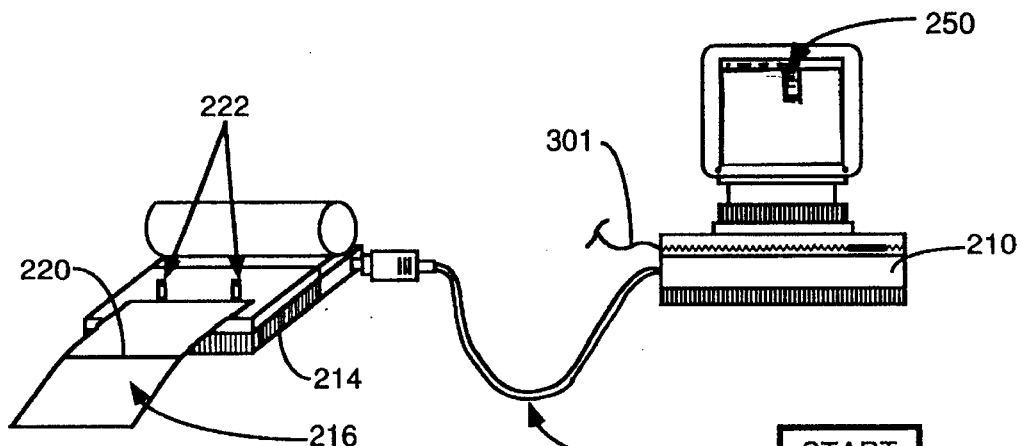
FIG. 12
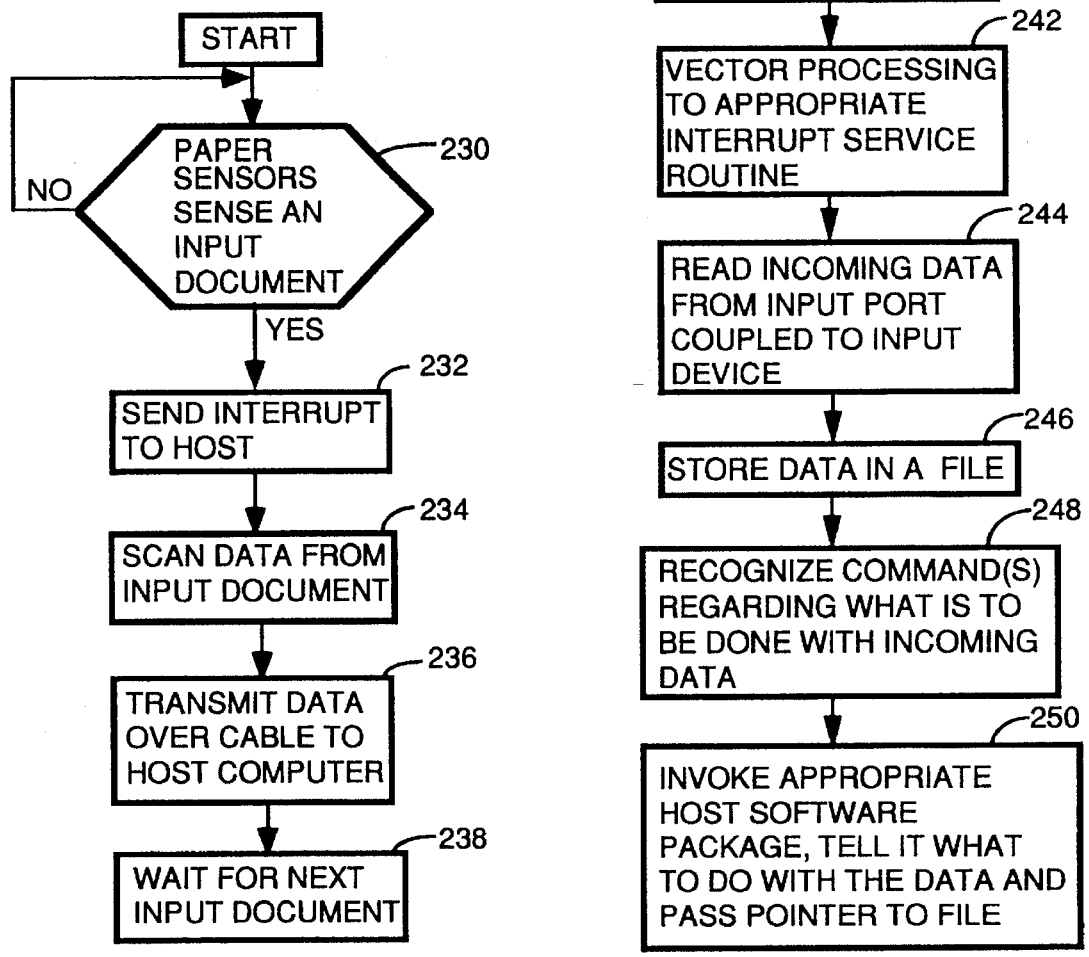
FIG. 13A
FIG. 13B

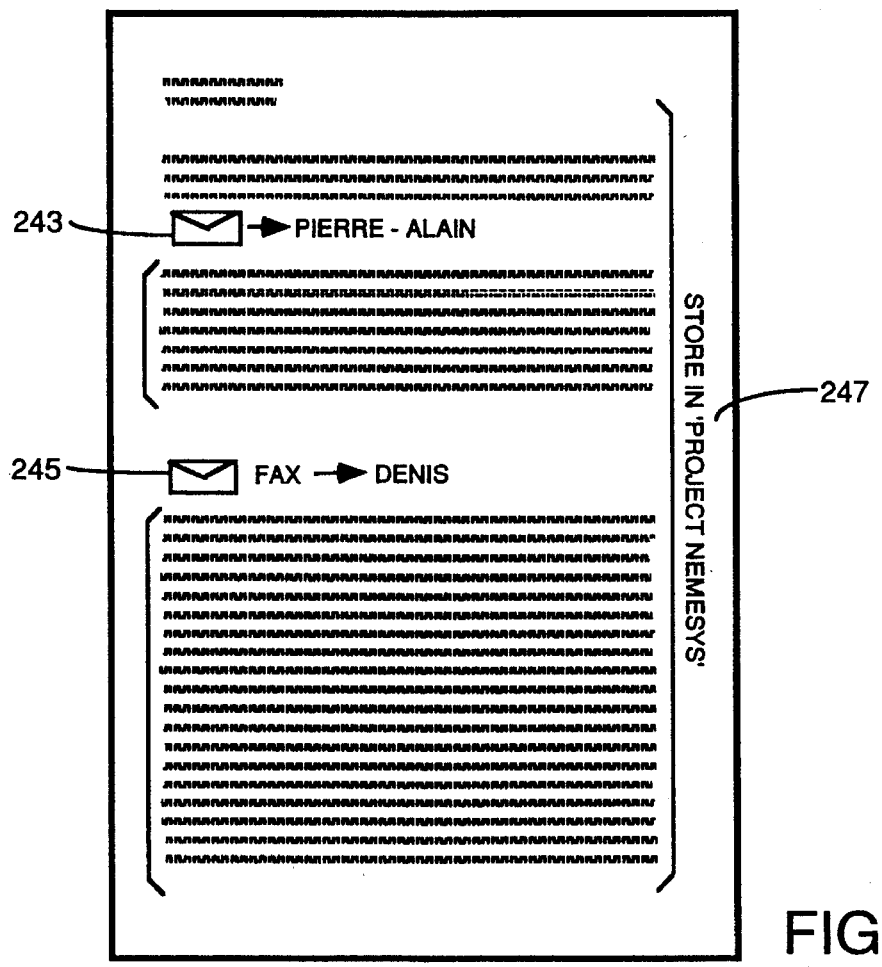
FIG. 16
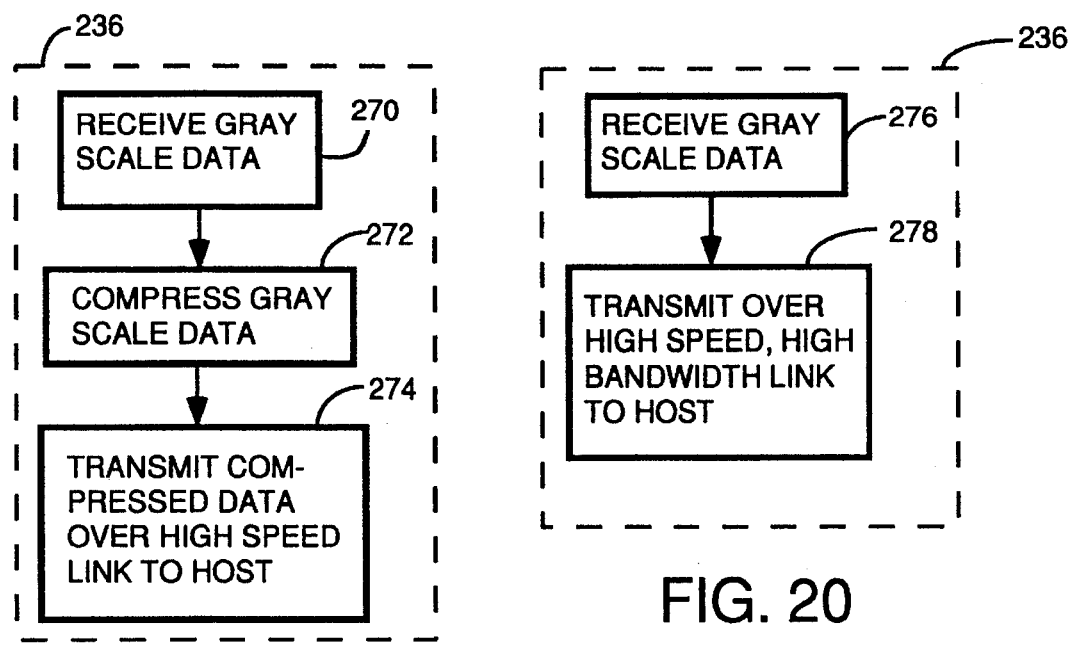
FIG. 19
FIG. 20

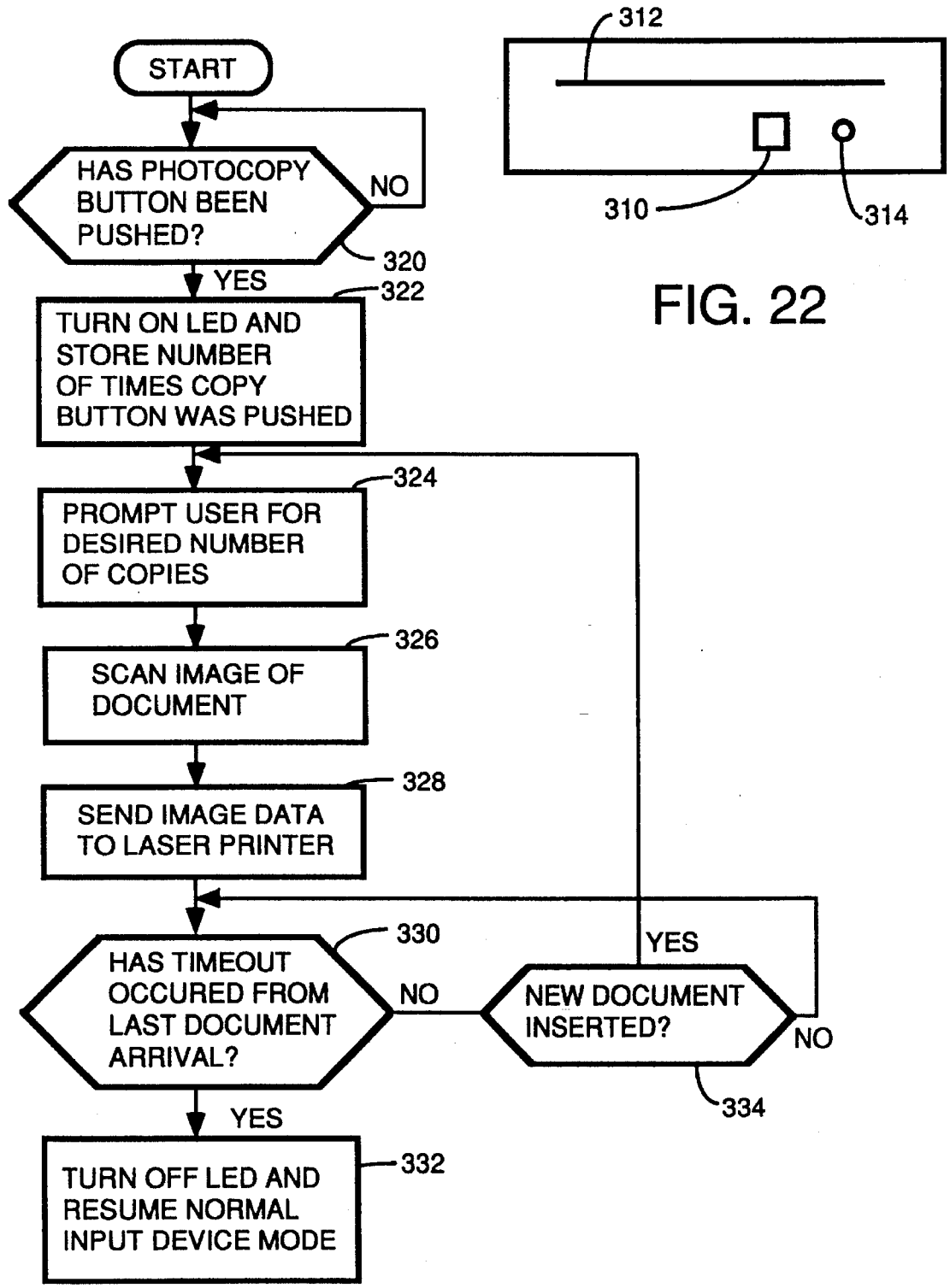

FAX IT!

RECIPIENT'S LAST NAME

FAX  PHOTOCOPY  E-MAIL

412

415

ATTRIBUTES

DOCUMENT-DRIVEN SCANNING INPUT DEVICE COMMUNICATING WITH A COMPUTER

BACKGROUND OF THE INVENTION

This is a continuation-in-part of U.S. patent application serial number 07/922,169, filed Jul. 29, 1992 entitled COMPUTER INPUT DEVICE USING PAPER INPUT DEVICE TECHNOLOGY FOR PAPER BASED COMPUTING. The invention pertains generally to the field of office equipment, and, more specifically, to the field of input devices for computer systems where a single serial port can be shared by the input device and by a FAX modem. In some embodiments, the input device is a low footprint scanning device which is mounted either by clips or permanently integrated into other peripherals for use with computer systems such as a monitor, keyboard etc.

In today's computing environment, simplicity is of increasing importance to users especially users who are unskilled in computer technology and who are not comfortable with the notion of having to modify their computers to adapt them to new technology. Many computers, especially Macintosh personal computers have only one RS232 port for use modems, serial printers, FAX modems or other serial devices. Thus, when a new serial device is added, it is necessary to multiplex the serial port manually with a switch or add a card to the computer to add another serial port. The foregoing discussion is equally applicable to parallel ports as those skilled in the art will appreciate. However, the need to physically switch the port to the other peripheral device is inconvenient, and if the user forgets to operate the switch, his or her software will generate an error message which may confuse and frustrate the user. Likewise the prospect of having to open the computer case and add a peripheral card is unpleasant to the technically unsophisticated user.

There are many applications of computer technology where having an input device which can scan images or text into a computer and automatically do something with the image such as perform electronic storage, electronic annotation, FAX the image or perform optical character recognition etc. This type of input device supports a growing trend called paper based computing. To add such a device to an existing computer system will often result in creating a problem for a user by presenting the user with two peripherals and two data cables that need to be plugged into the host computer but only one port into which to plug the cables. The user is then faced with the problem of either making the connection to the port to be shared through a switch or multiplexer to which both peripherals are coupled and which has a single output for coupling to the port to be shared or adding a card to the computer. Either option is inconvient and can be intimidating for less sophisticated users.

Therefore, a need has arisen for a smart input device using scanning technology which can share a single port on the host computer.

Another problem in today's computing environment with growing numbers of peripherals competing for space. Desk space is at a premium today as it is generally fixed in size while the number of personal productivity devices such as personal computers, FAX machines, paper input devices, printers, plotters, mice, mouse pads, calculators etc. continues to rise. The proliferation of these devices and their continually falling cost has caused a trend for more and more of such equipment to be placed at each individual employees workstation to improve productivity. Because of the need to have various documents, files, books, etc. on the desk or work station surfaces with all of these personal productivity tools, working space on these surfaces is at a premium. Such considerations have led to "tower" designs for some personal computers where the CPU unit can sit on the floor under a workstation and small footprint designs for other computers such as the original Macintosh™ personal computer designed to sit on top of a desk.

An input device using scanning technology is a very useful tool in today's environment. For example, in a contract negotiation, very frequently a written contract needs to be revised or new proposed terms need to be added by a person other than the person who originally wrote the contract. If the two people involved do not have compatible word processors, an input device using scanning technology allows one peon to send the draft and handwritten annotations to the other person for storage in his personal computer and possible revision.

Because an input device using scanning technology is a personal productivity tool which will probably begin to appear more frequently on individual employee work stations, a need has arisen for a input device using scanning technology with a small footprint to save space on already crowded surfaces for other productivity tools.

SUMMARY OF THE INVENTION

According to the teachings of the invention, there is disclosed an input device using scanning technology which is smart enough to share with another peripheral a single serial or parallel port thereby eliminating the need for a switch or a new driver circuit card to be installed in the host. In some embodiments, the input device using scanning technology has a zero footprint of space consumed on the surface of a workstation. The advantage of zero footprint is achieved by at least physical integration of the paper input device with another component of a host computer such as a monitor, keyboard, CPU, printer, etc.

As the term in used herein, an "paper input device" is a computer peripheral which senses the insertion of a document to be scanned, initiates a host computer process, i.e., controls the host process by insertion of the paper and symbols on the paper, scans the images and text on the paper, provides immediate user interface feedback while sending the scanned data to the host for further electronic processing such as display, transmission, storage or modification. Principally, this new technology is a paper input device using scanning technology which controls the host computer rather than the other way around, the latter being what is taught in the prior art. With such an input device, paper based computing is possible.

In the preferred embodiment, the input device using scanning technology includes a scanning mechanism. Special software in the input device compresses the scanned data, sends the scanned data to the host and automatically carries out the desired processing either by receiving a command from the user by manual pointing to menu selections presented to the user by the software or by automatic recognition of preprinted or hand drawn symbols on the document being scanned. Sharing of a single port of the host computer is accomplished by the software of the input device using scanning technology in implementing a passthrough connection to the other peripheral when the input device is not in use. In other words, the input device using scanning technology has its data cable plugged into the port of the host computer to be shared. The other peripheral such as a FAX modem etc. which must also be plugged into the same port is plugged into an appropriate connector of the input device. The software of the input device using scanning technology then passes any data from the other peripheral to the host or vice versa through a passthrough data path when the input device is not active. When the input device is active, the data path through the input device to the other peripheral is cut, and is taken over by the input device using scanning technology so that the compressed scanned data and commands may be sent to the host computer.

In some low or zero footprint embodiments, the input device using scanning technology is physically integrated with another computer component such as a computer monitor or CPU housing in any of several ways such that the input device does not have its own footprint but shares the footprint of the device to which it is attached. The input device using scanning technology may be plugged into specifically formed slots in the housing of the monitor, keyboard etc. by way of special pegs or legs extending from the paper input device chassis. Second, the input device using scanning technology can be physically mounted to the monitor, keyboard, etc. by mechanical adapters which are specially designed to be attached to both a surface of the input device and a surface of the monitor, keyboard, etc. This allows the monitor or keyboard to be used without being modified and allows upgrading to new monitors etc. A third way of mounting the input device using scanning technology is a partial inclusion option where the paper input device is mounted to, for example, a monitor, by any of the methods described above, and where some portion of the input device structure such as the paper receptacle is integrally formed as part of the housing of the monitor, keyboard, etc. This allows upgrading to different monitors etc. without buying a new input device. The final option is a full integration version where the electronics of the input device using scanning technology are enclosed within the housing of the monitor etc. The housing of the monitor etc. is modified in this option to have a slot through which papers to be scanned may be fed. The paper receptacle to received the papers after they have been scanned is also integrated into the housing of the monitor keyboard etc.

In each of the embodiments described above, the power and data connections for the input device using scanning technology can be made through the monitor, keyboard, etc. In other words, power to the paper input device can be through a connection to the power supply of the monitor, CPU, or through a connection from the keyboard to the CPU as part of the normal cable connecting the keyboard to the CPU. Likewise, the data output of the paper input device to the CPU may also, in some embodiments, be made through the cable connecting the monitor, keyboard, printer, etc. to the CPU using the serial or parallel port on the computer.

BRIEF DESCRIPTION OF THE DRAWINGS

FIG. 12 is a block diagram of a computer system using an input device.

FIGS. 13A and 13B are flow charts representing, respectively, processing by the input device and the input device software resident on the host for the preferred embodiment of one type of an input device in which the teachings of the invention may be employed.

FIG. 16 is a drawing of a typical input document using hand drawing command symbols and hand drawn auxiliary symbols located outside the hot zone or in hot zones not located at the top of the paper.

FIG. 19 is a flow chart of the process of compressing gray scale scanned data and transmitting it over a high speed link to the host.

FIG. 20 is a flow chart of the process of scanning gray scale data and transmitting it directly without compression from the input device to the host computer over a high speed, high bandwidth link.

FIG. 22 is a diagram of the front panel of an input device that implements a photocopy auxiliary function.

FIG. 23 is a flow chart of processing by input device software resident in both the paper input device and the host to implement a photocopy option in addition to or in lieu of the other processing previously described herein.

FIG. 29 is a drawing of a command sticker which is unique to the FAX command to the input device, but which includes a hot zone containing a number of boxes for all the letters of the alphabet by which the user can spell out the intended recipient by blackening the appropriate letter boxes.

FIG. 30 is a drawing of a general command sticker with two hot zones one of which contains numerous boxes for the universe of possible commands to the input device selection of one of which is by blackening the box and the other of which contains boxes which can be blackened to specify attributes needed for the specific command such as a FAX number.

DETAILED DESCRIPTION OF THE INVENTION

Figure 1:
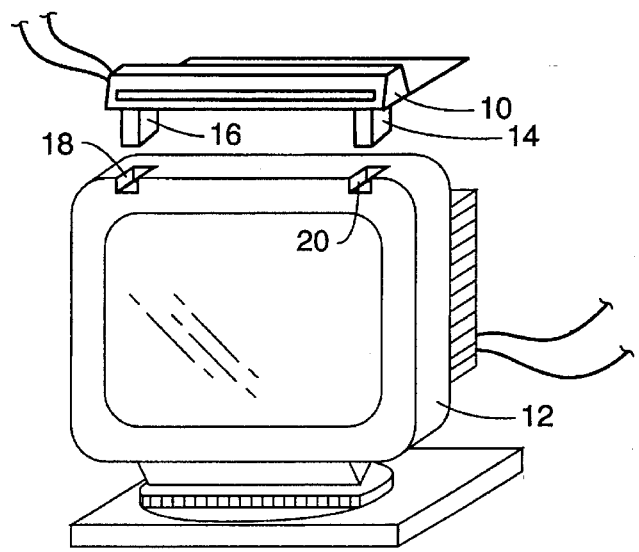
FIG. 1 is and exploded perspective view of a paper input device and computer monitor combination with zero footprint for the paper input device.

Referring to FIG. 1, there is shown an exploded view of a combination of a paper input device 10 and a computer monitor 12. In the embodiment shown in FIG. 1, the paper input device 10 is coupled to the monitor 12 by clips 14 and 16 which snap into slots 18 and 20 formed in the housing of the monitor 12. In other embodiments, the projections could be formed on the monitor, keyboard, etc. and fit into slots in the paper input device.

Figure 2:
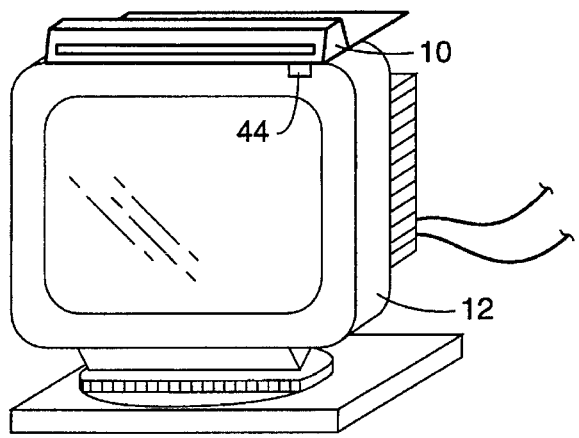
FIG. 2 is a perspective view of a combination monitor/paper input device with integral, mating electrical connections for power and data between the paper input device and the monitor and a single set of shared power and data cables.

FIG. 2 shows the embodiment of a combined paper input device and monitor with the paper input device fully mounted. Note that the paper input device has zero footprint as is does not touch the workstation surface which supports the monitor, but is supported by the monitor itself.

Figure 3:
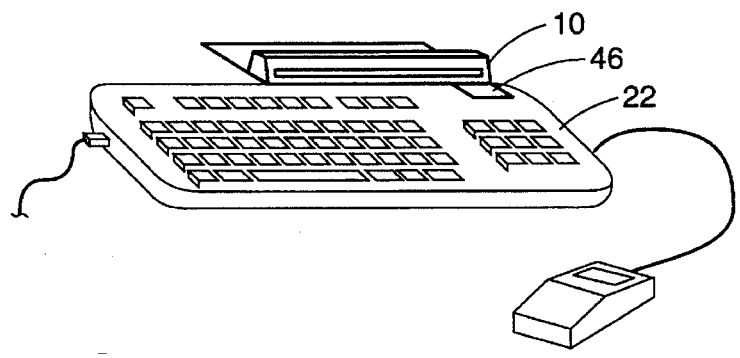
FIG. 3 shows a perspective view of an integral paper input device/keyboard combination.

FIG. 3 shows a perspective view of an embodiment of a combined paper input device 10 and keyboard 22. The paper input device 10 may be mounted on the keyboard in any known manner such as clips or brackets which are fastened to the keyboard. In the embodiment of FIG. 2, the paper input device is also supported by the keyboard and has no footprint of its own.

Figure 4:
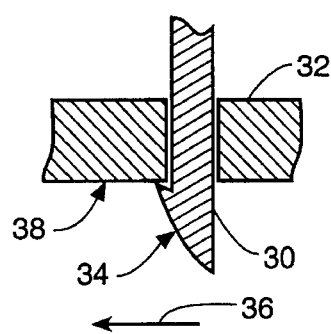
FIG. 4 shows a typical snap-in connection arrangement to mount the paper input device to any computer component.

FIG. 4 shows in cross-section one type of mechanical connection between the paper input device and the computer component to which it is mounted. The attachment mechanism of FIG. 4 is a snap-in type arrangement wherein a projecting portion formed on either the paper input device or the peripheral to which it is mounted fits into a slot formed in a surface 32 of the device on the opposite side of the connection. The centerline of the projection 30 is offset relative to the centerline of the slot in surface 32, i.e., misaligned slightly, such that when the projecting portion is pushed into the slot, the material of the projection or clip 30 is stressed so as to bias a projecting barb 34 in the direction of arrow 36. When the projecting portion is pushed far enough into the slot in surface 32, the barb 34 clears the underside 38 of the surface 32. The barb 34 then snaps in the direction of arrow 36 and locks the paper input device into a mechanical connection to the computer component or printer (or vice versa). Any of the externally mounted paper input devices described herein can be mounted physically as shown in FIG. 4.

Figure 5:
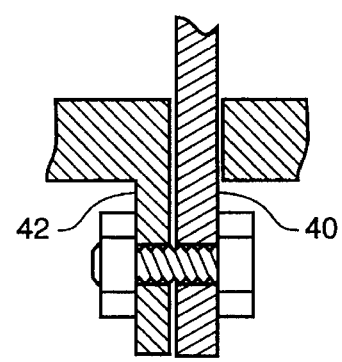
FIG. 5 shows a bolt-on mounting arrangement to mount the paper input device to the computer component.

FIG. 5 shows another embodiment by which the paper input device may be mechanically attached to the computer component or printer. In this embodiment, a projecting portion 40 of the paper input device, printer, or computer component is located so as to enter a slot in the mating component when the two devices are joined. The mating slot has associated therewith a flange 42 which mated with the projection 40 when the two devices are joined. Both the flange and the projection have holes formed therein through which a bolt or other fastener passes to mechanically affix one component to the other.

All of the embodiments disclosed herein can have the paper input device mounted to the mating component in the manner shown in FIGS. 4 or 5 or in any other known manner.

The most significant feature of the embodiments shown in FIGS. 1, 2, and 3 is that none of the paper input devices 10 consume any space on the workstation surface. Note also that the dimensions of the paper input device and its mating component do not need to match. Note also that the paper input device is easily reachable by the user in the embodiments of FIGS. 1, 2, and 3.

In one embodiment, the power and data connections to the paper input device are by way of mating male and female plugs mounted on the paper input device and the computer component to which it is attached. Typically, these mating plugs are mounted so that when the paper input device is physically mounted to the computer component, the plugs will simultaneously mate. In host computers that have multiple ports which can be used for the paper input device and the monitor, keyboard and/or printer, the paper input device can be plugged into its own port on the host computer, and the need for the data and power connections to be made to the host through the device to which the paper input device is mounted is alleviated.

In alternative embodiments, the cables carrying power and data can be connected to a single port of the host computer component and time division or frequency division multiplexed. In such an embodiment, the power and data connection to the paper input device is through a mating pair of plugs, one mounted to the paper input device and the other mounted to the peripheral to which it is mounted as symbolized by plug 44 in FIG. 2. The exact structure of the mating plugs is not critical to the invention. One of the advantages of this shared power and data connection embodiment beside having zero footprint is that there are no additional cords traversing the user's desk or otherwise tangling the user's work area other than the power and/or data cables for whatever computer component to which the paper input device is mounted.

Figure 6:
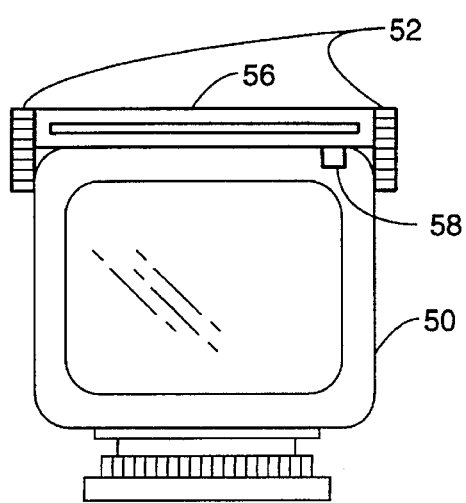
FIG. 6 shows a front elevation view of a monitor with a paper input device mounted thereon by specifically adapted mounting brackets.

Referring to FIG. 6, there is shown an embodiment of a paper input device which is integrally attached to a monitor or other computer component which has not been modified. In this embodiment, the monitor or the computer component 50 is connected to the paper input device by specially formed adapters 52. The adapters 52 shown in FIG. 6 are shown as straight brackets because the width of the paper input devices and monitor are the same. However, if the paper input devices and computer component do not have the same dimensions, the brackets 52 can take any other suitable form. In embodiments having the configuration shown in FIG. 6, a mating plug arrangement 58, as discussed above, can be used to supply power and data connections to the paper input device from the computer component on which it is mounted. The data connection must be multiplexed in any known manner. This eliminates extra cords for the paper input device cluttering the work area.

Figure 7:
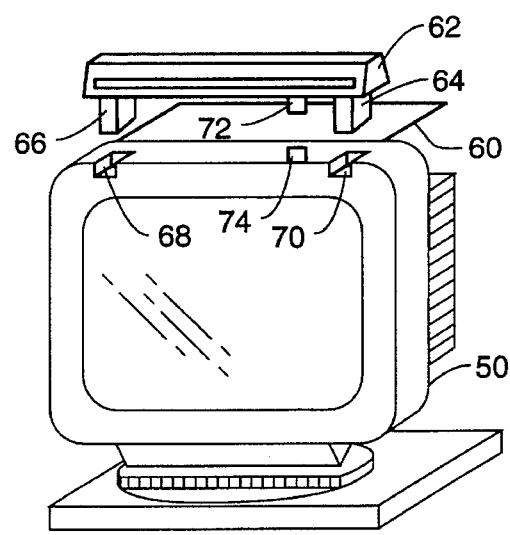
FIG. 7 shows an embodiment wherein a paper input device and a computer component share a common element.

Referring to FIG. 7, symbolizes another embodiment where the paper input device is partially integrated into the computer component in the sense that some element of the computer component such as a printer's paper catcher tray is shared between the paper input device and the computer component. Typically, this embodiment works best with printers with paper catcher trays. In the embodiment shown in FIG. 7, a paper receptacle 60 is formed as part of the monitor housing. The paper input device 62 is shown as having projections 64 and 66 which are inserted into slots 68 and 70 formed in the monitor housing, but mounting brackets such as brackets 52 may also be used if modification of the computer component housing is not desired. Also integral power and data connections to the paper input device through the computer component to which it is mounted may be used as symbolized by mating plugs 72 and 74. Of course, the power and data connections may also be by separate cables.

One advantage of all the embodiments wherein the paper input device is mounted to the computer component externally is that the computer component can be upgraded without having to discard the paper input device.

Figure 8:
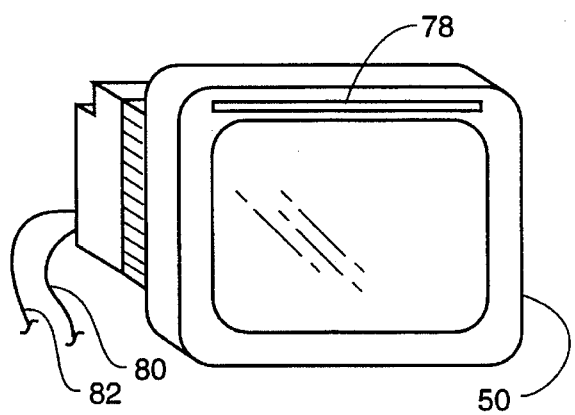
FIG. 8 is a perspective view of a monitor with a paper input device completely enclosed therein.

Referring to FIG. 8, there is shown an embodiment of a fully integrated version according to the teachings of the invention wherein a paper input device is completely contained within the housing of another computer component such as a monitor. In FIG. 8, the only evidence of the existence of the paper input device is the slot 78 formed in the housing of the monitor or other computer component 50. In the embodiments symbolized by FIG. 8, the power and data connections to the internal paper input device can be by way of integral connections to the power supply of the computer component and data may be transferred to and from the paper input device either via multiplexing the data port of the computer component and sharing the data connector of the computer component in which the paper input device is integrated or by a separate data cable dedicated to the paper input device which comes out of the housing of the computer component in addition to the data cable for the computer component itself. Alternatively, a single cable with two sets of data connectors, e.g., RS232 connectors, may be used. The dedicated cable embodiments where separate data cables are used for the computer component and the paper input device are symbolized by cables 80 and 82 in FIG. 8.

Figure 9:
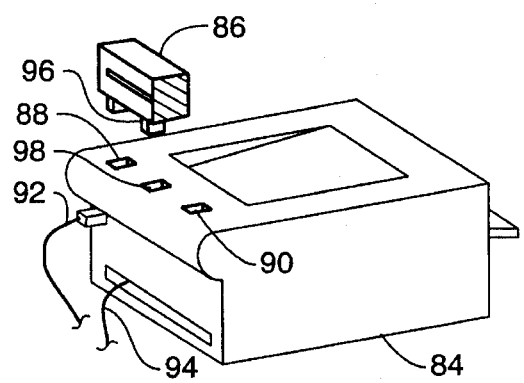
FIG. 9 shows and an embodiment for sharing a common element such as a paper tray between a paper input device and a laser printer.

The embodiments where the data cable is multiplexed between the computer component and the paper input device are symbolized by FIG. 9 which shows a laser printer 84 with a paper input device 86 mounted externally by clipping it into slots 88 and 90. A single power cord 92 supplies powers for both units. The data cable may be serial format such as RS232 or parallel format and is time division multiplexed as symbolized by cable 94. Power and data connections to the paper input device are supplied through matching integral mating plugs 96 and 98.

In embodiments with integral connections for power through the computer component to which it is mounted, power to the paper input device may be shut off either by shutting off the computer component or through the paper input device driver in execution on the CPU.

Figure 10:
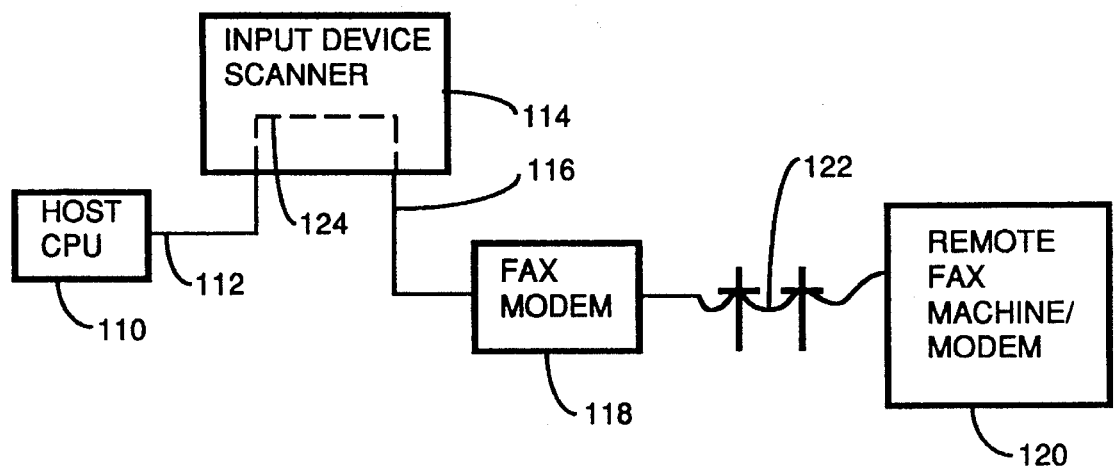
FIG. 10 shows a block diagram of the connections between the input device paper input device and a host and Fax modem for a passthrough connection.

Referring to FIG. 10, there is shown a block diagram of the connections to the host computer for a preferred embodiment of a "pass-through" paper input device which can share a single host data port with a Fax modem. In this embodiment, the host computer 110 has a single serial port such as an RS232 port 112. This serial port is coupled to an input device using scanning technology (hereafter paper input device) 114. The paper input device has another port 116 which is connected by a serial data cable 116 to a Fax modem 118. The Fax modem is connected to a remote Fax machine or Fax modem 120 by the telephone network 122. To alleviate the need to open the host 110 and add another serial port card (or parallel port for parallel data embodiments), the input device paper input device has a specially designed hardware and software structure which selectively couples the host computer 110 to the Fax modem via a passthrough data path 124 when the input device paper input device 114 is not in use. One embodiment for this selective passthrough data path is shown in FIG. 11.

Figure 11A:
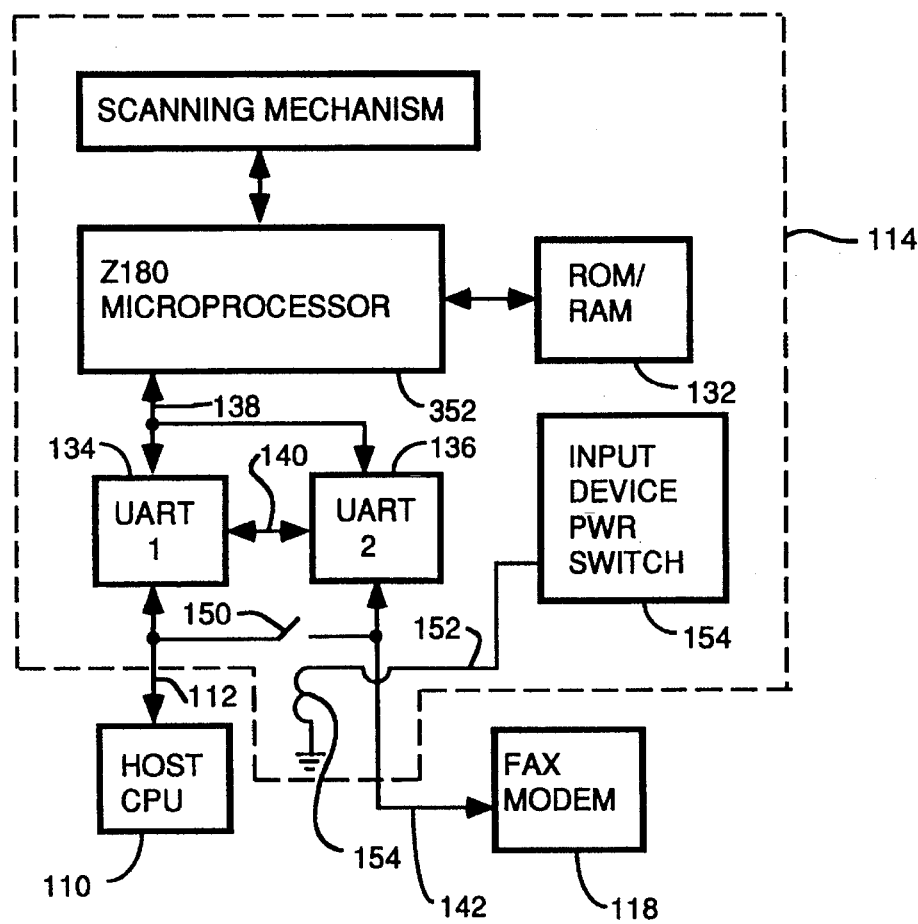
FIG. 11A shows a block diagram of the electronics of the input device using scanning technology to carry out the passthrough connection to allow the input device and Fax modem to share the same computer port.

Referring to FIG. 11A, a block diagram for one embodiment of the input device paper input device 114 electronics and their connections to the host and Fax modem are shown. The paper input device has its own microprocessor 130, which, in the preferred embodiment, is a Z180 manufactured by Zilog, Inc. The program which controls operations of the input device paper input device 114 is stored in ROM/RAM memory 132. The microprocessor 352 is coupled to two UARTS 134 and 136 by a data bus 138. Through this data bus, the microprocessor programs the UARTS such that UART 134 has an output port coupled to an input port of UART 136 and UART 136 has an output coupled to an input of UART 134 via two separate data path symbolized by line 140. The microprocessor 352 so programs the UARTS to automatically pass received data to the other UART whenever the input device 114 is not in use. In this state, whenever the host computer 110 sends data out on line 112 intended to be sent by the Fax modem 118 out on the telephone network 122, the data is automatically transferred by UART 134 to UART 136 via data path 140 and automatically transferred to the Fax modem 118 via data path 142. Conversely, when a Fax arrives, the Fax modem 118 sends the data via data path 142 to UART 136 where it is automatically transferred via data path 140 to the UART 134, and from there to the host computer 110.

When a user inserts a document into the input device 114 for scanning, a sensor senses the presence of the document and interrupts the microprocessor 130. The microprocessor 352 then vectors to an interrupt service routine which includes a routine to check the data path 140 to determine if data is being transferred between the two UARTS. This is done in any conventional way such as by reading a status flag from one or both of the UARTS, reading a data sensor (not shown) coupled to the data path 140. If the data path 140 is busy, the document which has been inserted for scanning is rejected in the preferred embodiment. In alternative embodiments, the document may be scanned and the data buffered in RAM memory 132 until such time as data path 140 is not busy.

As soon as the data path is not busy, the microprocessor 130 writes new programming data into the registers of the UARTS 134 and 136 to uncouple them such that the input device 114 can send the scanned data to the host computer 110 for further processing or to the Fax moden 118 for transmission as a FAX. The input device software controlling themicroprocessor 352 includes software routines to send the appropriate commands to the Fax modem to control its operations in sending the scanned data as a Fax.

When the power to the input device using scanning technology 114 is off, a relay 150 makes a direct connection between data path 112 and data path 142 thereby bypassing the input device and connecting the shared data port of the host directly to the Fax modem 118. The relay150 is normally closed, and is forced to the open state where the data path 112 is not connected to the data path 142 by application of power to the input device 114. This is symbolized by the line 152 coupling the relay coil 154 to the input device power switch 154.

Figure 11B:
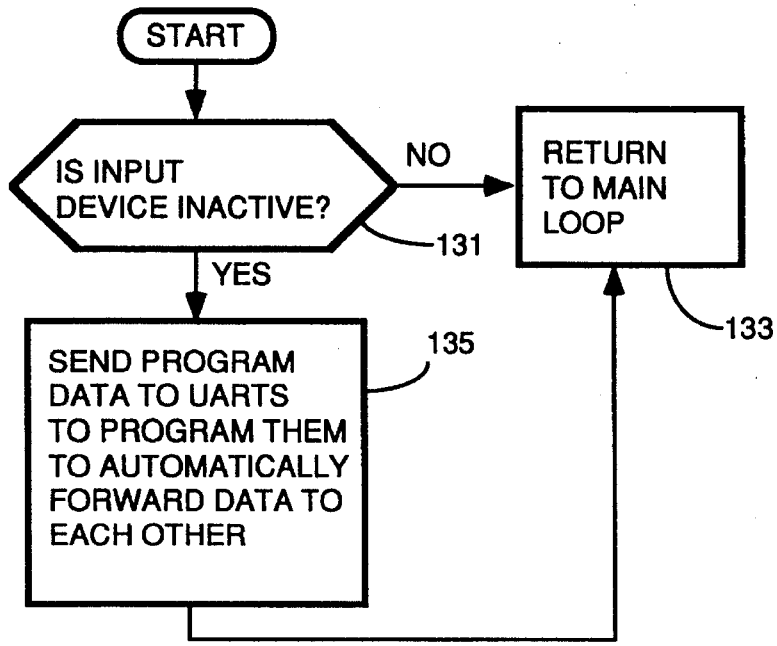
FIGS. 11B and 11C are flow diagrams of the software executed by the microprocessor of the input device to manage the "passthrough" connection from the host to another peripheral so that the input device can share a single data port with, for example, a Fax modem.

Referring to FIG. 11B, there is shown a flow diagram for the program executed bymicroprocessor 352 to manage the "passthrough" connection. This program may be a subroutine which is periodically run or which runs upon some event such as an interrupt generated when the main program to handle scanning and transmitting data to the host concludes operations. The first step 131 in the process is to test whether the input device is busy scanning, compressing and/or transmitting data. In some embodiments where the routine of FIG. 11B runs only upon an interrupt occurs indicating the input device is not busy, this test 131 can be eliminated.

Upon determination that the input device is busy, as symbolized by block 133, processing returns to the main loop as symbolized by flow diagrams of the various embodiments symbolized by FIGS. 13A, 19, 20, 21, 22A, or 25.

If the test of block 131 determines that the input device is not busy, processing proceeds to block 135. This block symbolizes the process whereby themicroprocessor 352 in FIG. 11A sends data via data bus 138 to the UARTS 134 and 136 for storage in their status registers causing them to couple to each other via the inter-UART data path 140. In this configuration, any data arriving from the host on bus 112, is automatically transferred to UART 136 for automatic transmission on bus 142 to the Fax modem 118, and any data arriving from the Fax modem on bus 142 is automatically forwarded on data path 140 to the UART 134 for automatic transmission to the host 110 on bus 112. Thereafter, processing returns to the main loop as symbolized by block 133.

Figure 11C:
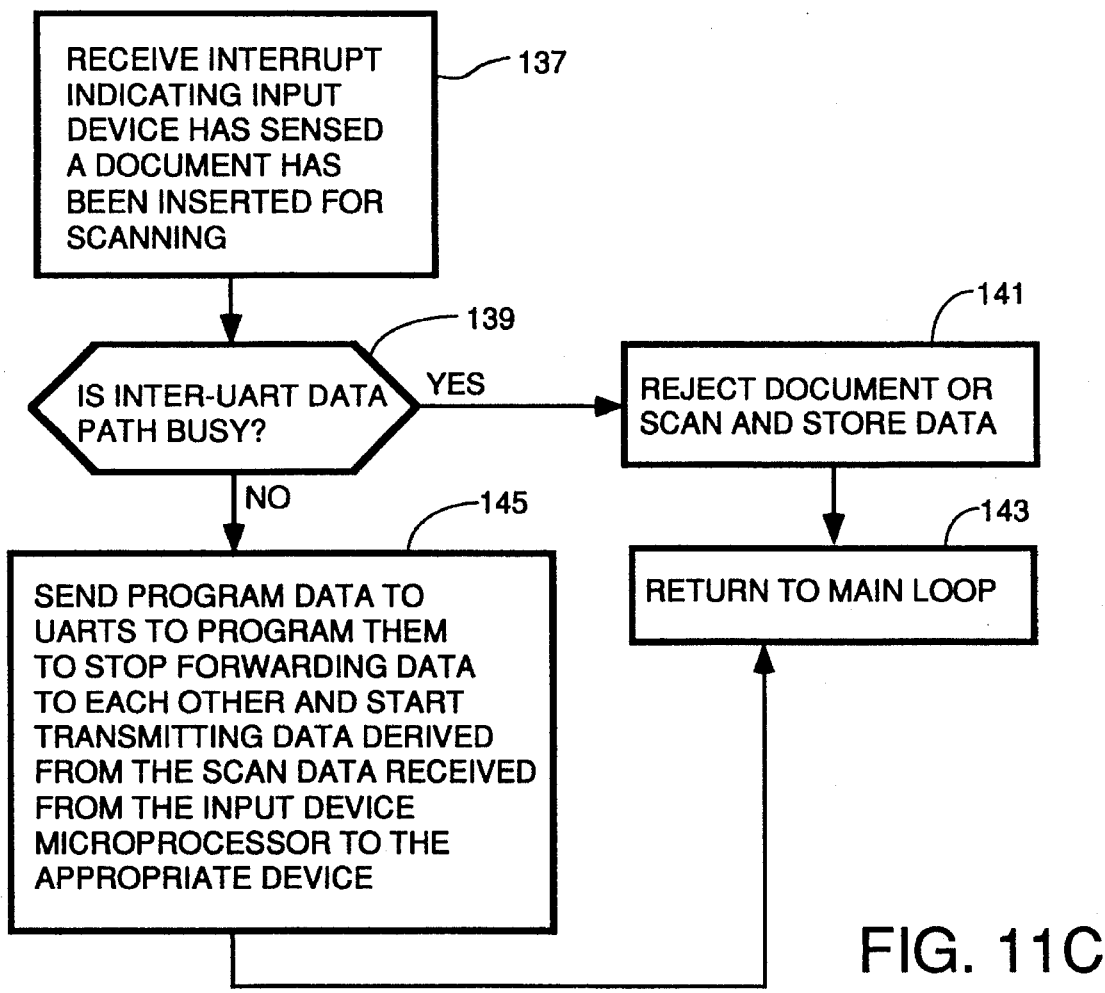

Referring to FIG. 11C, there is shown a flow diagram of processing performed by the input device microprocessor 352 in embodiments where the automatic passthrough feature is implemented. Block 137 represents the process of receiving any interrupt generated by the paper sensors when a new document is inserted for scanning. This can be the same interrupt generated by block 232 in FIG. 13A or by block 282 in FIG. 21A or it can be a separate interrupt or a polling interrupt generated by an internal timer. When this event occurs, the test of block 139 is performed to determine if the inter-UART data path 140 is busy indicating the host computer is in session with the Fax modem or vice versa.

If the inter-UART data path is busy, the processing of block 141 is performed to reverse the direction of the paper input device motors and reject the document. In alternative embodiments, the document is scanned anyway and the data is buffered either before or after being compressed, preferably after, for later transmission to the host computer or the Fax modem. Then processing returns to the main loop as symbolized by block 143.

If the inter-UART data path is not busy, the processing of block 145 is performed. The process symbolized by this block involves the microprocessor 352 sending appropriate programming data to the UARTS to cause them to be reprogrammed so as to uncouple from each other. The new program data reprograms the UARTS, such that data derived from the scan data sent by the microprocessor via data bus 138 to UART 134 is automatically transmitted to the host computer 110 via data path 112. Likewise, the new program data reprograms the UARTS such that data derived from the scan data and sent by the microprocessor 352 via data bus 138 to UART 136 is automatically transmitted to the Fax modem 118 via bus 142. Thereafter, processing returns to the main loop.

Referring to FIG. 12, there is shown a computing system using the input device using scanning technology. A host computer 210 is coupled via an RS232 cable 212 to an input device 214. The input device 214 uses paper input device technology to generate a plurality of parallel scan lines of pixel data. Each scan line is the image of one line of black and white or gray scale data across an the document 16 being scanned. Scan line 220 is typical of this plurality of scan lines.

Figure 17:
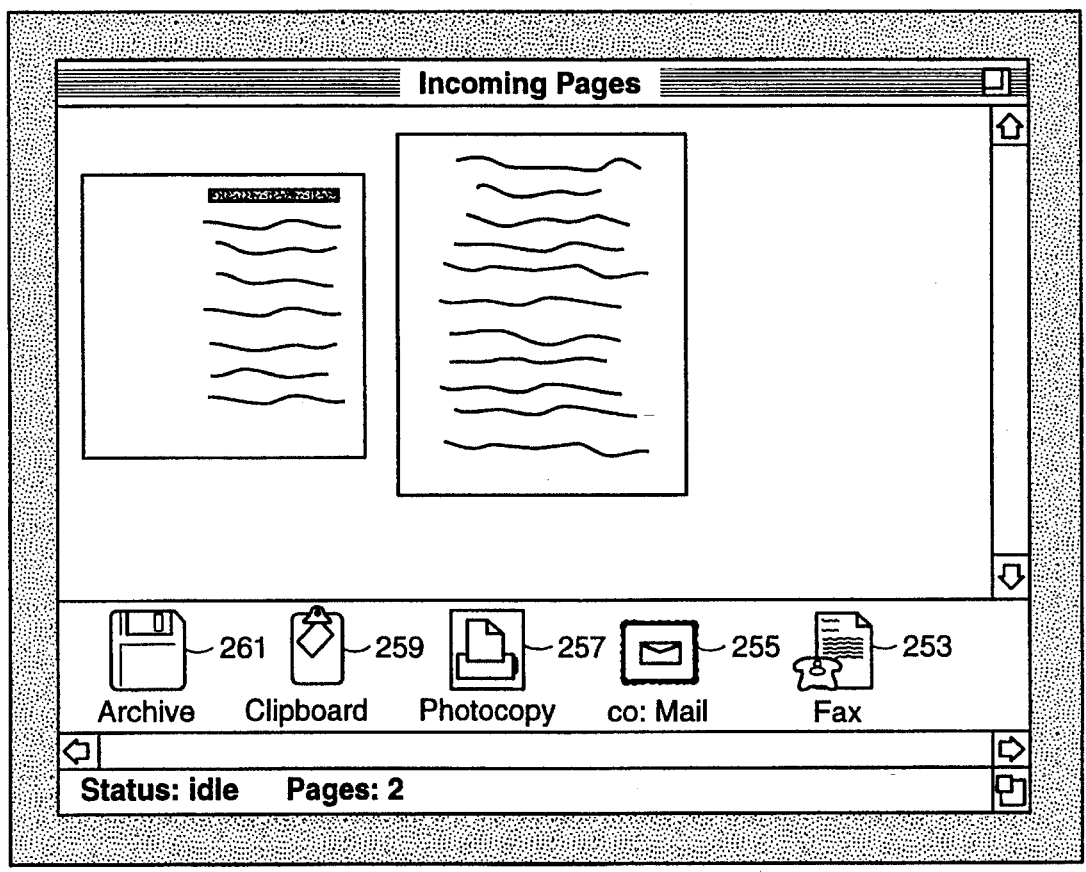
FIG. 17 is a drawing of a typical pop-up window with menu options displayed therein, said menu option being determined by the input device software based upon the software which exists on the host machine.

The input device 214 uses one or more paper sensors such as sensors 222 to sense the insertion of the document to be scanned into the input device 214. These paper sensors generate a signal which triggers the scanning mechanism in the input device to start drawing the document 216 into the input device and passing it under a linear imaging array such as a CCD which generates scan lines of data. The insertion of the paper also causes a code to be sent over the RS232 cable to the input device software resident on the host 210 which triggers the host to read the serial port to which the RS232 cable 212 is coupled to receive the data coming in from the input device 214. In the preferred embodiment, this code is an interrupt which vectors processing by the host to a service routine which then reads the incoming serial data from the input device and stores it in a file. The software of the input device resident on the host also generates a drop down menu 250 presenting options to the user regarding what should be done with the scanned image. These menu options can be such things as "FAX this image" as symbolized by icon 253 or "Send this image as an E-mail message" as symbolized by icon 255, or "Send this image to the laser printer for printing" as symbolized by icon 257 or "Paste this image into clipboard memory" as symbolized by icon 259, or "Archive this image on the bulk storage device" as symbolized by icon 261. In some embodiments, there will be an option to "Perform word processing on this image after performing optical character recognition on it in background mode" etc. FIG. 17 shows a typical menu dialog box that can be presented in embodiments where the user must manually make the selection of what to do with the image.

In other embodiments, the input device software resident on the host (hereafter the ID host software) analyzes the input stream to find a code therein which tells the ID host software what is to be done with the incoming data.

In either embodiment, after the determination is made regarding what is to be done with the incoming data, the ID host software then passes a command or commands and a pointer to the appropriate software package resident on the host to invoke the appropriate software package, tell it what to do and tell it where the file is which contains the data just received from the input device. In the preferred embodiment, all this happens automatically without any act by the user other than placing the paper in the paper input device. This process is symbolized by the flow charts of FIG. 13A and 13B which represent processing by the input device and the ID host software, respectively.

Referring to FIG. 13A, block 230 represents the process of sensing the insertion of the paper to be scanned. The paper sensors can be microswitches, proximity sensors or use light beams which are interrupted by the presence of the paper. The preferred method is to use light beams or other all-electronic sensors as the reliability is greater than a mechanical microswitch.

Block 232 represents the process of sending an interrupt to the host computer 210 to inform it that a document to be scanned has been inserted and that scanned data will be arriving shortly. In alternative embodiments, the input device software resident on the host can poll the input device periodically to determine if a paper has been input for scanning. If it has, the acknowlegment message from the input device will serve to cause the ID host software to perform the processing described above.

Block 234 represents the process of scanning the data from the document, including the process of scanning the document for a symbol which indicates what the host is to do with the scanned image data. In the preferred embodiment, the input device includes symbol recognition software that can recognize symbols on the document to be scanned which indicate whether the document is to be FAX'ed, sent as E-mail etc. These symbols can be either preprinted on the document, drawn on the document by hand by the user or placed on the document such as by a sticker or label. In some embodiments, the symbols may be printed on the document using software that has predefined graphic images for every type command which the input device can execute and which can print these symbols on the document to be scanned by running the document through a laser printer etc. In any of these embodiments, automatic processing of the scanned image is started in the preferred embodiment by the recognition of the symbol by the input device without the user having to press any buttons, make any menu selections etc.

The use of stickers is preferred because the manufacturer can "pretrain" the symbol recognition software to recognize specific symbols to be shipped with the software for the input device to invoke specific types of software commonly found on user's computers or to invoke specific "macros" or predefined sequences of instructions. This eliminates the need for symbol recognition software that is smart enough to recognize or learn the possible variations in symbols that may arise in the field when user's print or draw their own symbols on the paper to be scanned. Likewise, the use of software which has predefined graphic symbols stored therein which can be printed on the document to be scanned is also preferable to having the user draw his or her own symbols on the document to be scanned by virtue of the elimination of the need for software which is smart enough to learn the user's custom symbols. Symbols lend more simplicity to the process of using the input device, eliminate the need for user's to print or draw symbols on papers to be scanned. This eliminates the expense of having to print different sets of stationary with different symbols for different purposes and the inconvenience of having to draw a specific symbol on a paper to cause the input device to perform a particular function. The use of stickers also prevents the frustration of running out of stationary with whatever preprinted symbol is needed to perform whatever operation is desired thereby allowing user's the flexibility of using whatever paper is handy for a particular job for scanning.

Figure 26:
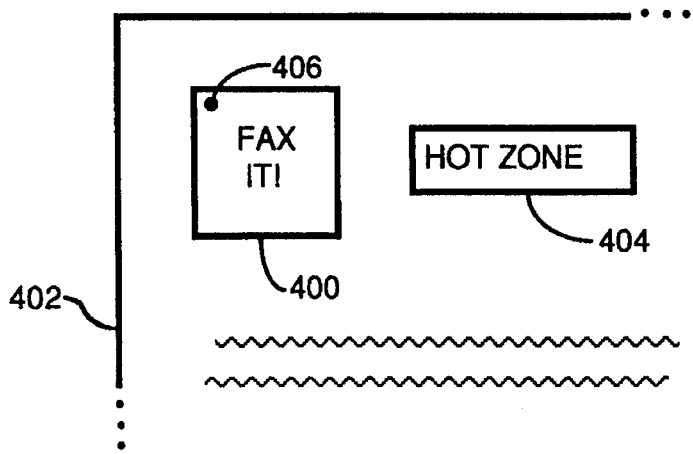
FIG. 26 is a drawing of a command sticker for a FAX command to the input device with an external hot zone, said sticker to be placed on a document to be scanned and thereby causing the scanned image to be FAXed to whatever destination is identified by symbols written in the hot zone.
Figure 27:
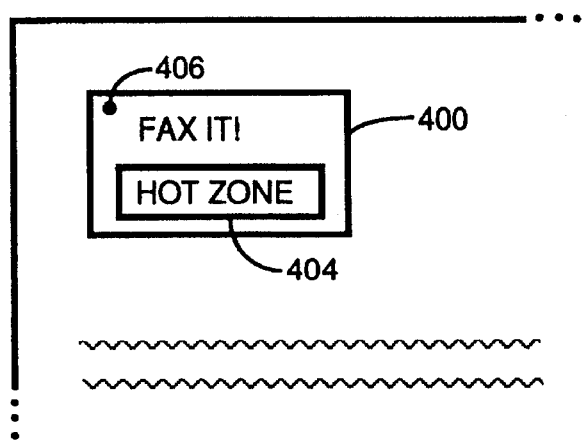
FIG. 27 is a drawing of a command sticker for a FAX command to the input device with an internal hot zone in which the symbols identifying the destination FAX number are written.

In some embodiments, the sticker itself can have a "hot zone" which the recognition software associates with the sticker and in which the recognition software will look for attributes such as FAX phone numbers etc. This hot zone can be within the sticker itself or adjacent thereto. An example of a sticker with an external hot zone is shown in FIG. 26. The recognition software is taught to recognize the bit map of sticker 400 as a command to invoke the appropriate host software to receive the scanned image of document 402 and send it to the FAX modem 118 in FIG. 10 as soon as the data links 112 and 116 are free. In such an embodiment, the user can handwrite the FAX phone number in the hot zone 404 for recognition. The recognition software is trained to look for attribute symbols in the hot zone at some predetermined horizontal and vertical offset from the index point 406 on the sticker. Another embodiment is shown in FIG. 27, where the hot zone 404 is within the perimeter of the sticker 400. Again, the recognition software is trained to look and recognize handwritten symbols such as phone number within the hot zone which is known to be located at a certain horizontal and vertical offset from from the index mark 406.

Figure 28:
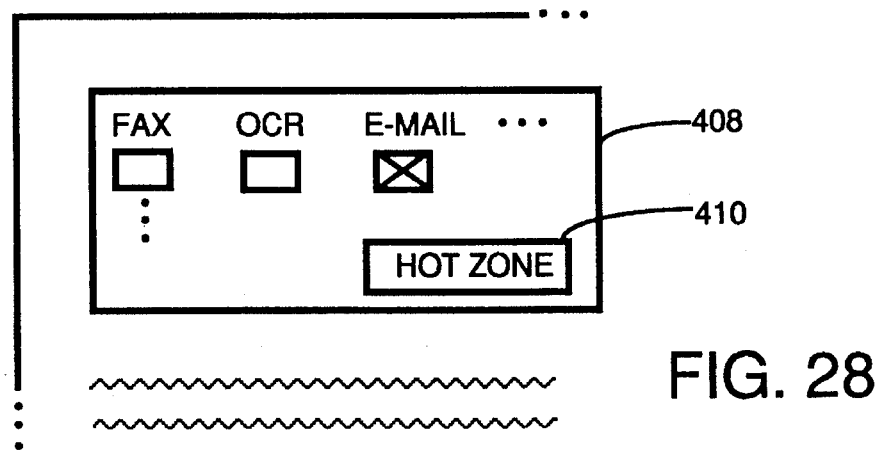
FIG. 28 is a drawing of a command sticker with two hot zones, one of which contains a number of boxes which can be checked to indicate which input device command is to be invoked, and the other of which is for writing symbols needed for some commands such as a FAX number.

In some embodiments, a single sticker can be used for all commands to the input device software with specific "command boxes" within the perimeter of the sticker which the user can blacken out with a pencil or pen to indicate which particular command of the overall set of input device commands is desired by the user. An example of this kind of sticker is shown at 408 in FIG. 28. In this particular example, the E-mail box is blackened causing the E-mail software resident on the host to be invoked and to send the image as an E-mail message. The identity of the particular addressee is gleaned by the recognition software from whatever symbols the user writes in the hot zone 410.

In other embodiments, there will be an individual sticker which is unique for each command. The stickers in this set which need supplementary symbols such as a name from a FAX directory or a FAX phone number have letter and/or number boxes within the perimeter of the sticker which include the letters of the alphabet or the numbers from 0 to 9 for each number of a telephone number are included. These boxes can be blackened with a pencil or pen by the user to indicate the name of the recipient or the FAX number to which the FAX is to be sent. For example, if the user wishes to send a FAX to Mr. Smith at FAX number 555–1212, then the "FAX it" symbol is affixed to the page to be sent and letter boxes of "Smith" are blackened or the appropriate boxes for 555–1212 are blackened. The page is then automatically scanned, the symbol recognized and the image sent as a FAX to the appropriate FAX machine. An example of this type of sticker is shown at 411 in FIG. 29. A sticker to invoke the FAX software on the host is shown with a hot zone at 413 for entering the recipient's last name by blackening the appropriate boxes of an alphabet associated with each letter of the last name. In the example shown, the letter boxes for the first three letters of "Smith" are blackened.

In some embodiments, the symbols can have two hot zones one of which includes boxes for the particular command to be invoked and one of which includes letter or numberboxes to be blackened by the user to indicate the attributes of the command such as the FAX number, file name etc. An example of such a sticker is shown at 412 in FIG. 30. In the example shown a general sticker with the E-mail box checked is shown with a hot zone at 415 containing number boxes and letter boxes. In the number boxes, the sequence of numbers "1011" have been selected indicating the E-mail recipient is E-mail address 1011 which is mapped to some particular person, E-mail address and communication protocol by which the image from the scanned document 400 is to be sent.

Figure 14:
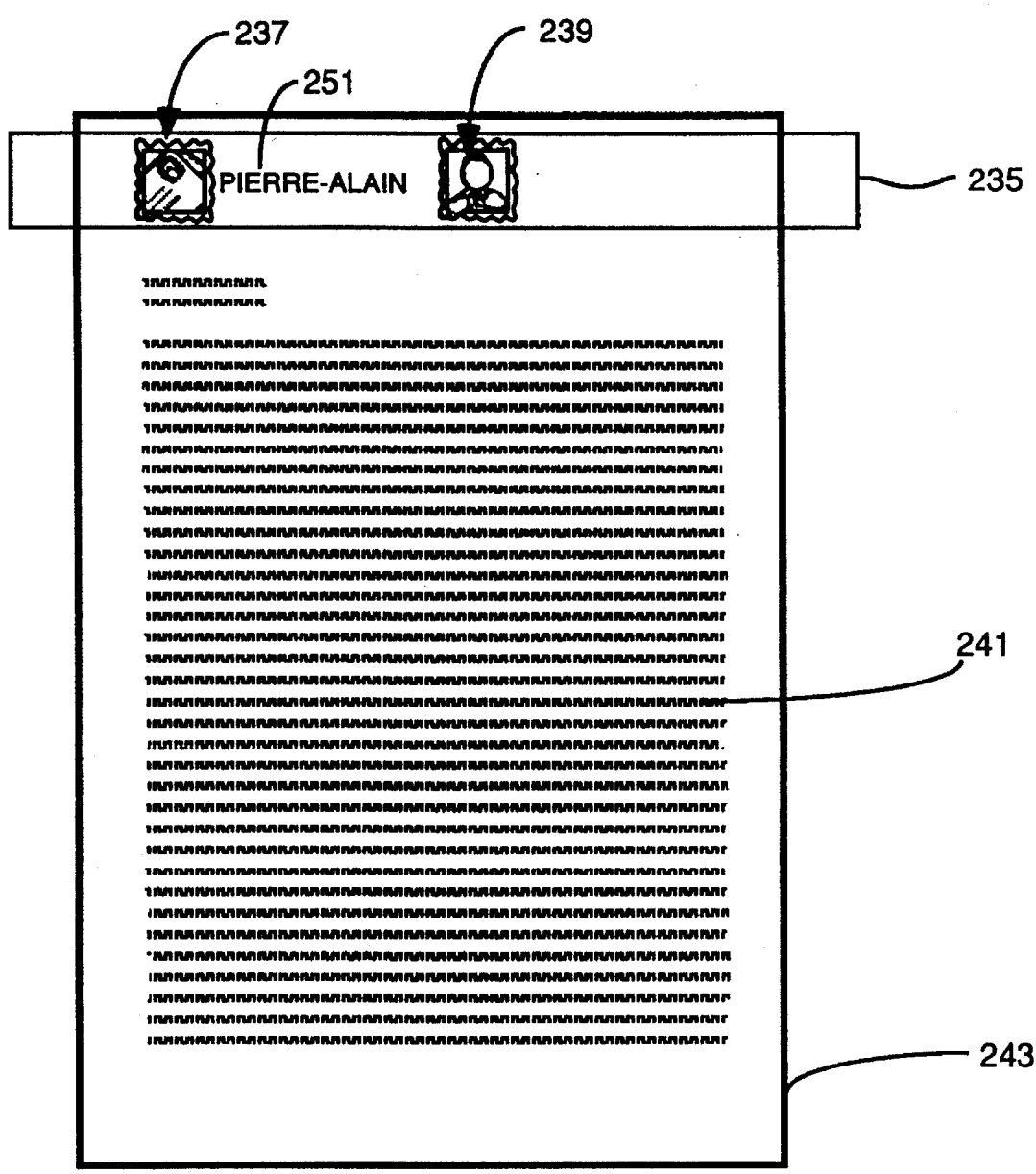
FIG. 14 is a drawing of a typical input document using predefined command symbols and predefined auxiliary symbols located in a hot zone.

FIG. 14 represents one way of using this input device technology where the symbols are placed in a predetermined "hot zone" 235. Typically, the hot zone will be some predetermined portion at the top edge of the paper to be scanned, but in other embodiments it can be any predetermined portion of the paper. By using a hot zone, the job of the recognition software portion of the input device software is made easier, because there is no need to search the entire document for a symbol that can be recognized. In FIG. 14, an E-mail symbol 237 and a FAX symbol 239 are present in the hot zone. The block 234 in FIG. 13A represents, in addition to scanning the main body 241 of the document 243 in FIG. 14, the process of scanning these symbols in the hot zone, recognizing them and translating these symbols into commands that will be used by the ID host software to invoke the proper software package. In some embodiments, all the possible command symbols will be printed in the hot zone and the user will indicate which one is active by placing auxiliary symbols such as a FAX number or file name next to the desired command symbol. In other embodiments, the user may use a different pre-printed document form for each type of operation. For example, if a FAX is to be sent, the user will select a form having a preprinted FAX command symbol in the hot zone. The user will then add the auxiliary symbols such as the recipients name or FAX number either by hand or by placing a "sticker" next to the command symbol and type or scribble the FAX message. The recognition software will then determine the appropriate telephone number to which the FAX is to be sent by the recognition processes described elsewhere herein, scan the image on the document, and send the scanned data to the host for transmission by the host's FAX software.

Figure 15:
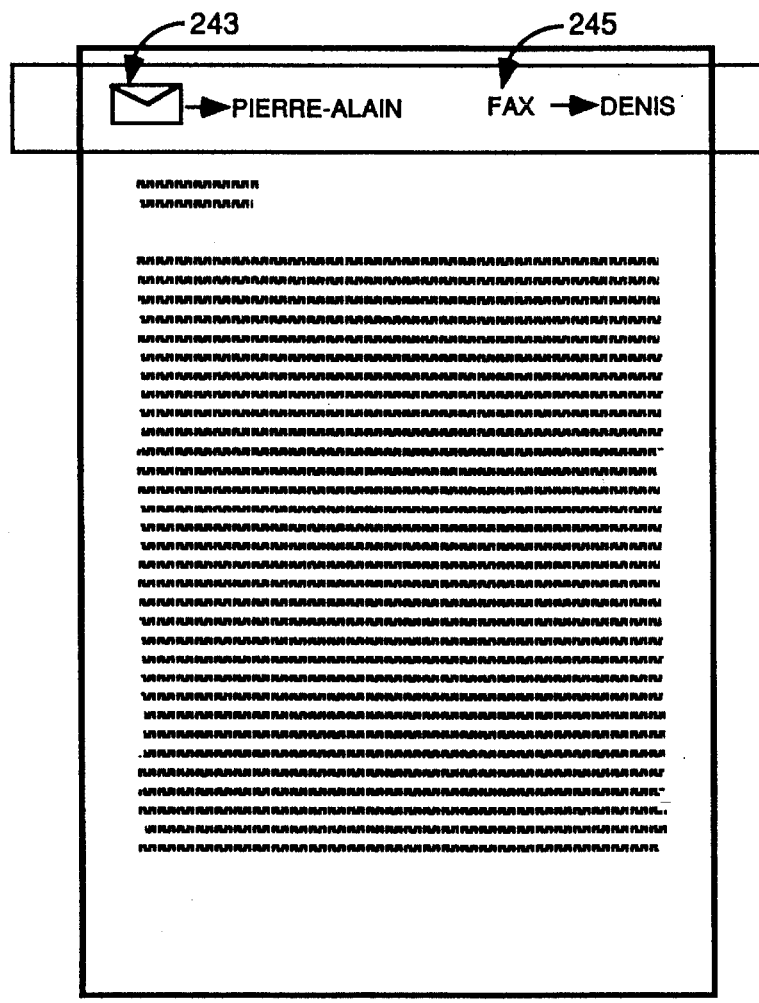
FIG. 15 is a drawing of a typical input document using hand drawn command symbols and hand drawn auxiliary symbols that the input device must be trained to recognize, the symbols being located in a hot zone.

Whereas FIG. 14 represents a case where the command symbols are formalized ahead of time, FIG. 15 represents a class of embodiments wherein the command symbol is not formalized ahead of time but is hand drawn in the hot zone. Of course, the recognition software in the input device has to have been previously trained to recognize the hand drawn symbols. Such recognition software can be any of the trainable recognition software packages currently commercially available, the details of which are hereby incorporated by reference. The exact details of the recognition software are not critical to the invention, and any recognition software or system that can recognize hand drawn symbols will suffice for purposes of practicing the invention. In FIG. 15, the symbol 243 represents the command symbol for E-mail could be sticker whereas the symbol 245 represents the command symbol for E-Fax.

FIG. 16 represents the classes of embodiments where the command symbols 243 and 245 are placed either in hot zones which are not at the top of the page or randomly placed on the page. Recognition of symbols where random placement on the page is practiced is more easily performed when formalized symbols or "stickers" are used which the recognition software has already been trained to recognize. Symbol 247 represents a command symbol to store the document with an attribute symbol in quotation marks indicating the name of the file into which the document is to be stored.

Note that in each of the documents illustrated in FIGS. 14–16, auxiliary or attribute symbols are included next to the command symbols to control the processing commanded by the command symbol. For example, in FIG. 14, the E-mail symbol 237 causes the input device software to recognize the fact that the scanned image is to be sent as an E-mail image and issue a command to invoke the E-mail software in the host. The attribute symbol in this case is shown at 251 and is a name "Pierre-Alain". This symbol is analyzed by the input device recognition software by comparing it to a list of previously stored symbols representing the names of all the people to whom the user may wish to send a FAX. The symbol can be anything, and does not need to be text or numbers. For example, it can be a geometric shape such as a multisided figure such as a hexagon etc. The comparison can by any known process such as correlation, pattern recognition, area and/or perimeter analysis, and the details of how it is done is not critical to the invention. In some embodiments, the recognition software analyzes each letter or digit of the attribute symbol, but, in the preferred embodiment, the entire name or entire number is analyzed as a whole and compared to a plurality of patterns comprising all the possible names, telephone numbers, file names etc. which the symbol on the document could possibly be. Once a sufficient degree of confidence has been developed as to which of the universe of possible symbols the attribute symbol is, the recognition software makes the appropriate translation by looking up in a database associated with the universe of possible attribute symbols the appropriate E-mail address, network address, FAX phone number, file path name and file name etc. which the user intended by placement of the attribute symbol on the page. The input device software then generates the appropriate commands to send to the host software package invoked by the command symbol to cause the host software so invoked to appropriately process the data received from the input device. The input device host resident software then sends a pointer to the invoked host software indicating to it where the data received from the input device can be found.

This type of input processing vastly simplifies the life of the user who only needs to know the name of the person to whom he or she wishes to send a FAX or E-mail message and is decoupled from the need to know how to invoke the appropriate software and how to run it to do the desired processing. Decoupling users from the complexities of how to run the multitudes of different types of software packages available should boost the productivity of computer literate users and bring new users into the pool who might not have otherwise entered because of the entry barrier of learning about complex computers and software.

Returning to the consideration of FIG. 13A, box 236 represents the process of transmitting the scanned image data from the document inserted by the user. In the preferred embodiment, the scanned image data is compressed by the input device software on the paper input device side of the RS232 cable before being transmitted to the host 210 and this process is included within the process of transmitting the data represented by box 236. Any known data compression process may be used for the pre-transmission compression process, and the details of how it is done are not critical to the invention. The details of the prior art image compression algorithms are incorporated by reference as if set out fully herein. In the preferred embodiment, known FAX machine Group III and Group IV compression algorithm is used, and the details thereof are hereby incorporated by reference. Although RS232 format transmission with data compression and decompression on opposite ends of the RS232 cable is used in the preferred embodiment, in an alternative embodiment, a high speed, parallel format transmission protocol is used. In this embodiment, the cable 212 is a parallel format cable. For more details on the serial format transmission protocol of the preferred embodiment, the reader should refer to FIG. 18.

The input device software then waits for the next document to be inserted as represented by box 238.

Referring to FIG. 13B, there is shown a flow chart for the processing performed by input device software resident on the host. In the embodiment represented by FIGS. 13A and 13B, and interrupt driven scheme is used. Box 240 represents the process of receiving the interrupt from the input device 214 in FIG. 12 when the paper sensors sense the arrival of a new document to be scanned. The interrupt causes the host 210 to stop whatever it is doing and vector processing to an interrupt service routine assigned to the interrupt number assigned to input device 214 as symbolized by box 242. The data scanned from the document is then received from the RS232 cable and, in the preferred embodiment, the incoming data is decompressed by the input device software resident on the host and is stored in a file as symbolized by box 244. In other embodiments, the compression and decompression process can be omitted at the cost of longer transmission times on serial cable 212. Box 246 represents the process of storing the received data in a file.

Box 248 represents the process of recognizing commands as to what is to be done with the incoming data. In the preferred embodiment, the commands regarding what is to be done with the data arriving from the input device are manually entered by the user by selections from a menu of options which automatically appears whenever the interrupt from the input device occurs. In the preferred embodiment, the menu of options appears automatically as a pop-up window as symbolized by box 250 in FIG. 12. FIG. 17 represents a typical pop-up window in which the various menu options appear. The input device software resident in the host automatically generates the menu options by checking the bulk storage memory device (typically a hard disk) and the random access memory to determine what software packages are resident and then generates a menu option for each capability of the host as represented by these software packages. Typically, the user then selects a menu option by pointing and clicking with a mouse or by typing a highlighted letter in the menu option on the computer keyboard. In alternative embodiments, the process of box 248 represents the process of recognizing commands in the data stream generated by a symbol recognition process which is part of the process of scanning the image on the document 216 represented by box 234. As described above, the symbol recognition process recognizes in one of the ways described above or some equivalent way a particular symbol on the document which has been selected by the user as representing the desired processing of the data scanned in by the input device. The symbol selection is by one of the ways described above or some equivalent manner. After the selected symbol is recognized in the process of box 234, a translation to the appropriate command is made by the input device software resident on the paper input device 214 and the command is sent over RS232 cable 212 to the host. The input device software resident on the host then receives and recognizes these commands and issues the appropriate commands to the software on the host capable of doing the function indicated by the commands received from the input device symbol recognition software as symbolized by box 250. The ID host software also transmits appropriate attribute data to the selected host software package such as the FAX phone number or E-mail address to allow the selected host software to complete processing the data this process is also symbolized by box 250. The attribute data may be generated by any of the symbol recognition processes described above carried out by the input device software resident on the scanning mechanism, or it can be done by the input device software resident on the host in response to data entered manually by the user through the keyboard, and each of these alternative embodiments is intended to be symbolized by the process of box 250 in FIG. 13B.

Figure 18:
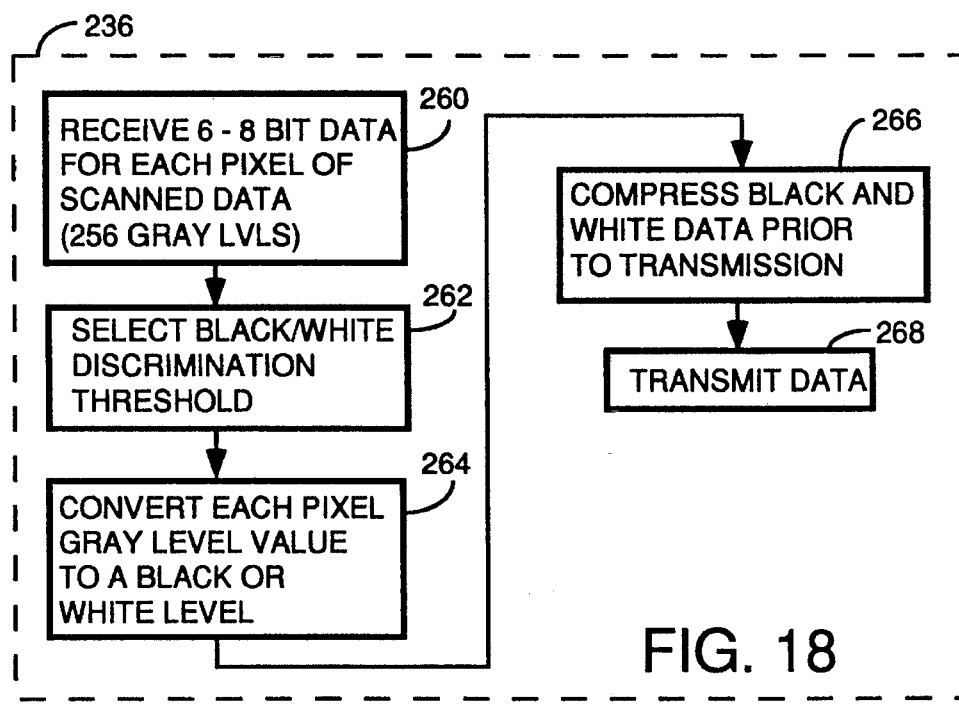
FIG. 18 is a flow chart of a process carried out by the preferred embodiment of the input device for converting gray scale pixel data to black and white data, compressing the data and transmitting it to the host for decompression and use or storage.

Referring to FIG. 18, there is shown a flow chart of the process of compressing and transmitting data, usually in RS232 protocol. Although the flow chart of FIG. 18 is encircled by a dashed box labeled 236 to symbolize the fact that the process shown in FIG. 18 is a more detailed description of the process symbolized by box 236 in FIG. 13A, in reality the process symbolized by FIG. 18 is only one class of embodiments represented by box 236 in FIG. 13A and box 236 is intended also to symbolize the class of embodiments where parallel transmission is used. Box 236 symbolizes any form of transmission of data to the host including transmission over a local or wide area network, satellite, packet radio, ISDN transmission, etc.

Normally, the scanning mechanisms used in the input device which can employ the teachings of the invention generate pixel data using 256 or more gray levels. This translates to eight bits per pixel. Since serial protocol transmission is bandwidth limited, it is preferred to transmit black and white data where each pixel's data is a single bit which is either a 1 or 0 representing black or white. This conversion from gray scale to black and white is followed by compression of the black and white data and serial transmission of the compressed data. The result is large savings in transmission time.

The first step in this process is symbolized by block 260 where the gray scale data is received from the process symbolized by box 234 in FIG. 13A. Next, a black/white discrimination threshold level is selected to be used in converting the gray scale data to black and white information as symbolized by block 262. If, for example, 256 gray levels are present, the discrimination threshold may be arbitrarily preset at 128 so that any gray level having a decimal value below 128 is set at binary 0 for black and any pixel having a gray level greater than 128 can be set at binary 1 for white.

The process of selecting the black/white discrimination threshold symbolized by block 262 can be done by any of a number of ways. The preferred method is to select a predetermined threshold level such as 128 or some other level which has been experimentally determined to work best in most cases. In an alternative embodiment, the user can change the threshold for each document he inputs by changing a "preferences" attribute in his control panel menu for the input device software. A selectable default value such as the last value selected or some predetermined value can be used if the user fails to specify a preference.

In another alternative embodiment, the user can put the document in the paper input device and the input device software will automatically scan the document, send the data to the host in any of the ways described herein, and the input device software resident on the host will then cause a pop-up window to appear on the screen where the image of the scanned document appears. The user then inspects the image to determine readability and, if the contrast or readability is not to his or her liking, the user can then change the discrimination threshold. In one version of this class of embodiments, the gray scale data will be stored in a memory in the input device paper input device mechanism 214 in FIG. 12. The input device host resident software then receives the user's new preference for the discrimination threshold and sends it to the input device software resident on the paper input device 214. The gray scale data is then reprocessed with the new discrimination threshold and new black and white data is generated and sent to the input device host resident software for re-display. This process continues until the scanned image displayed on the host meets the user's needs.

In another alternative embodiment, the black/white discrimination threshold can be selected automatically based upon the scan results of a test pattern with various contrasting patterns printed on the input document.

After the threshold is selected by one of these methods, the gray scale data is converted to black and white data as symbolized by block 264. Blocks 266 and 268 in FIG. 18 represent the process of compressing the black and white data and transmitting it on the RS232 cable to the host, respectively.

In some embodiments, especially parallel protocol transmission embodiments or other embodiments where bandwidth is not at such a premium, e.g., where a fiber optic transmission medium is used between the input device and the host, the steps of selecting a discrimination threshold and converting the pixel data from gray scale to black and white may be omitted and the gray scale data may be transmitted directly to the host or compressed and then transmitted to the host for decompression and display.

FIG. 19 represents the transmission process of block 236 in FIG. 13A where gray scale data is received from the linear imaging array (block 270), compressed using any known compression algorithm suitable for compressing gray scale data (block 272), and transmitted over a high speed link to the host (block 274). FIG. 20 represents the embodiments wherein the transmission process of box 236 in FIG. 13A comprises the steps of receiving the gray scale data (block 276) and transmitting it directly over a high speed, high bandwidth link to the host as symbolized by block 278. In alternative embodiments, the uncompressed gray scale data or the compressed gray scale data may be transmitted to the host using a serial format transmission protocol such as the RS232 specification using an RS232 cable, a parallel format, high speed, high bandwidth cable or a fiber optic link etc. In the embodiments using the process of FIG. 20, it is preferred to use a parallel format, high speed, high bandwidth cable or a fiber optic link, but a serial format transmission protocol such as the RS232 specification can also be used although this will result in greater delay in getting the data to the host.

Figure 21A:
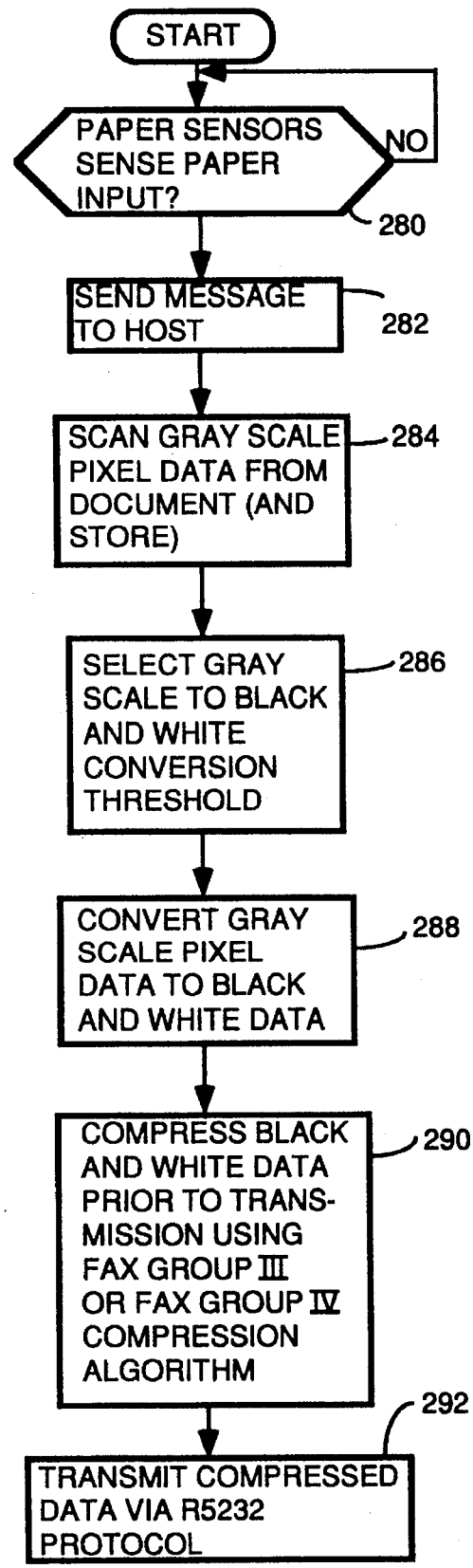
FIG. 21A is a flow chart of processing by the input device software resident in the paper input device and FIG. 21B is a flow chart of processing by the input device software resident on the host computer to implement the preferred embodiment according to the teachings of the invention.
Figure 21B:
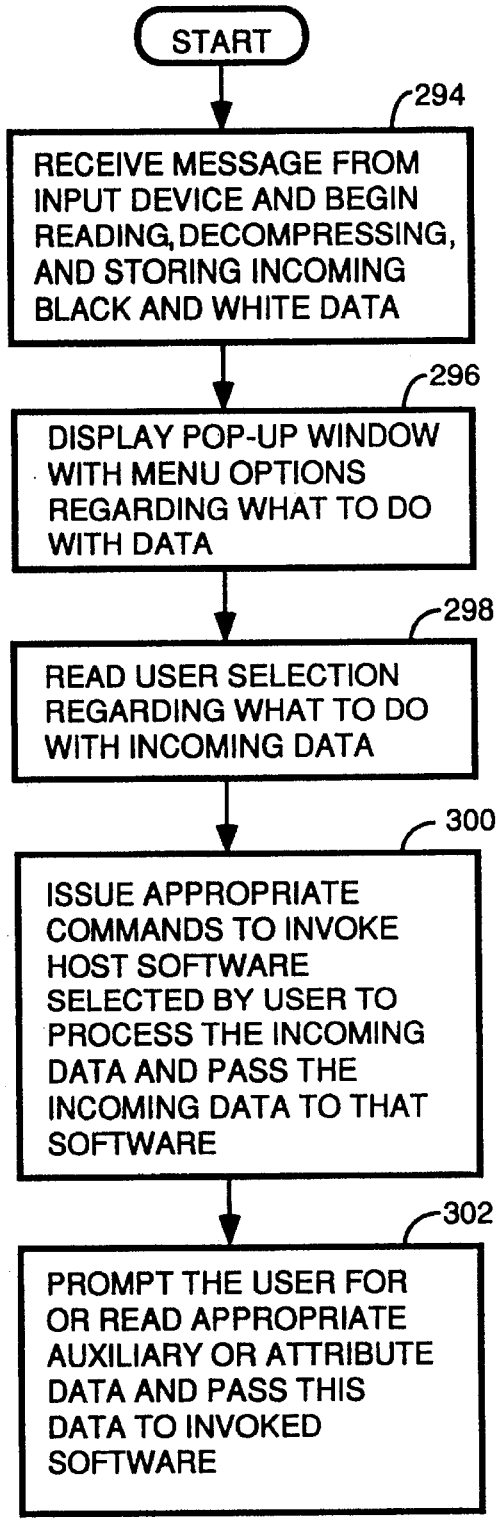

Referring to FIGS. 21A and 21B, there are shown flow charts for processing by the input device software resident in the paper input device and the host, respectively, in the preferred embodiment. The software resident in the paper input device begins processing by sensing the insertion of a paper to be scanned symbolized by box 280. As soon as the presence of a paper to be scanned is sensed, the process symbolized by box 282 occurs to send a message, preferably an interrupt, to the input device software resident in the host 210 to inform the host resident input device software that scanning is about to start and to prepare it to receive the data.

Box 284 represents the process of scanning the document and deriving from the images on the document gray scale data. Although something other than 256 levels could be used, in the preferred embodiment, 256 gray scale levels are used and an 8-bit byte is generated for each pixel on each scan line. In the preferred embodiment, the gray scale data is not permanently stored in a file for later reprocessing such as when the discrimination threshold changes, but in alternative embodiments, the gray scale data will be stored in a file in RAM or on a bulk storage device such as a hard disk, CD RAM, streaming tape, PLI drive etc. These alternative embodiments are represented by the notation "(and store)" inside box 284.

Box 286 represents the process of selecting the gray scale to black and white conversion threshold by any of the methods discussed above.

Box 288 represents the process of converting each gray scale pixel value to a one bit black and white level which is either 0 or 1 depending upon the gray scale value relative to the selected discrimination threshold.

Box 290 represents the process of compressing the black and white pixel data using the known FAX Group III or FAX Group IV compression algorithm. Any other compression algorithm could also be used. In alternative embodiments, steps 286 and 288 could be eliminated and the process symbolized by box 290 would be compression of the gray scale data using an algorithm suitable for gray scale compression.

The final step carried out by the input device resident in the paper input device is to transmit the compressed data to the host as symbolized by block 292. In the preferred embodiment, the transmission is done via an RS232 serial protocol, but in alternative embodiments, the transmission of the compressed data can be over a parallel cable, a fiber optic link etc. In other alternative embodiments, especially those using fiber optic links between the input device paper input device and the host, steps 286, 288 and 290 can be eliminated and the gray scale data can be transmitted to the host in uncompressed fashion.

Referring to FIG. 21B, there is shown a flow chart of processing by the input device software resident in the host computer. The first step is symbolized by box 294 to receive the message from the paper input device that scanning is about to start or has already started and to prepare to receive data. Typically, this will result in the invocation of an interrupt service routine which reads the incoming data from the RS232 port, decompresses it and stores it in a file on a hard disk, RAM etc. Box 296 represents the process in the preferred embodiment of generating a pop-up window showing the options the user has to process the incoming data. The options displayed in the pop-up window depend upon the software packages and circuit cards of the host computer. The available options are determined by the input device software resident on the host at installation, and may be updated as new capabilities are added to the host computer. A typical pop-up window of user menu options is shown in FIG. 17. In the preferred embodiment, the incoming data is also displayed in a pop-up window, but in other embodiments, the incoming data may be shunted directly to whatever software package is to process it or directly into a file in random access memory or on an internal or external bulk storage device without display in a pop-up window.

Box 298 represents the process of receiving the user input regarding what is to be done with the incoming data. Typically, this is done by processing a mouse click on a menu option in a dialog box such as that shown in FIG. 17 or receiving the typed name of the desired option or at least one predefined letter symbolizing the menu option.

Box 300 represents the process of translating the user input command regarding what is to be done with the incoming data into the appropriate commands to invoke the software package capable of doing the selected processing.

This software selected to do the job is usually resident on the host or some external bulk storage memory device, in the preferred embodiment, but could also be resident on a file server coupled to the host via a local area network. The class of embodiments where the invoked software is resident of a file server coupled to the host 210 by a network or other link is symbolized by the network pigtail 301 in FIG. 12. Box 300 also symbolizes the process of passing the incoming data to the host software package so invoked in the preferred embodiment. In alternative embodiments, the scanned data is not sent directly to the software invoked by the user but, instead, a pointer to the file where the incoming data from the paper input device has been stored is passed.

Finally, box 302 symbolizes the process of passing the invoked software any auxiliary or attribute data needed by the invoked software to do the desired processing. Such auxiliary data might be the FAX phone number where the image is to be sent, the E-mail address, the file name of the spreadsheet or word processing document into which the data is to be loaded, etc. In the preferred embodiment, the input device host resident software prompts the user for the necessary auxiliary data, but, as discussed above, the auxiliary data may also be generated by the paper input device recognition software by recognition processing of pre-defined or learned symbols placed on the scanned document. In some embodiments, the recognition software then translates the recognized symbol in the appropriate auxiliary data such as by comparing the recognized symbol to a list of known symbols in a data base of records that include all the possible symbols and their associated data such as phone number etc. and sends the appropriate auxiliary data to the input device host resident software for re-transmission to the invoked software. In other embodiments, the recognition software sends only the name of the recognized symbol to the input device host software which then does the aforementioned translation and sends the appropriate auxiliary data to the invoked software.

Referring to FIG. 22, there is shown a representation of the front panel of an input device according to an alternative embodiment where a "photocopy" function is implemented using the laser printer of the host computer to which the input device is coupled. In this embodiment, the user has the option of pressing copy button 310 one or more times and inserting a document to be copied into slot 312. The input device will then light front panel LED 314 to indicate the input device is in the copy mode. As long as LED 314 is lit, the input device will scan the images on any documents pushed into slot 312 and will send the images to the laser printer (not shown) for printing in background mode without interrupting processing occurring on the host machine. The LED will stay on a selectable interval after the document to be copied is placed in the slot 312, and as long as the LED is on, any document placed in the slot 312 will be scanned and sent to the laser printer in background mode for copying. The interval that the LED remains on after the last document is placed in the slot can be set by the user through a preferences menu option.

Referring to FIG. 23, there is shown a flow chart of the processing carried out by the input device software to implement the copy function. This function can be in addition to the other processing described elsewhere herein or in lieu thereof. Box 320 is a test to determine if the copy button has been pushed and, if not, to wait for it to be pushed. If the copy button has been pushed, box 320 also symbolizes the process of determining how many times the copy button was pushed.

Box 322 represents the process of turning on the LED 314 and storing the number of times the copy button was pushed. The user has the option of indicating how many copies of each document to make by pushing the copy button the number of times corresponding to the number of copies desired or to respond to a prompt regarding the desired number of copies. If the user has only pressed the copy button once, box 324 represents the process of prompting the user for the desired number of copies such as by a pop-up dialog box or any other technique.

Box 326 represents the process of scanning the image of the document. In the preferred embodiment, the scanned data is gray scale data and is converted to black and white data by any of the processes described earlier herein. In alternative embodiments, the gray scale data can be sent directly to the laser printer without conversion to black and white. In still other embodiments, the user can be presented the option of sending either gray scale data or black and white data through a pop-up dialog box which may or may not include display of the scanned image and an option for the user to specify the gray scale to black and white conversion threshold to use if black and white data is to be sent. In some embodiments of this class, the displayed image will be black and white data after conversion with the default conversion threshold, and, if the user specifies a different threshold, the gray scale data stored in a file after the scan will be reprocessed with the new threshold and a new black and white image will be displayed. Once the user is satisfied with the image, the pop-up dialog box includes a send or copy option that the user can select such as by clicking on it with a mouse etc. to send the image to the laser printer. Box 326 represents all these embodiments.

Box 328 represents the process of sending the image data to the printer.

Box 330 represents the process of determining whether timeout has occurred since the entry of the last document scanned for copying purposes. If it has, the LED 314 in FIG. 23 is turned off, as symbolized by box 332. If timeout has not occurred, the process of box 334 is performed to determine if a new document has been inserted. If not, the system idles until either a new document is inserted or timeout occurs, whichever occurs first. If a new document has been inserted, processing returns to box 324 to begin the copy process. If no new number of copies is specified in box 324, the default number equal to the number of times the copy button was pressed is used. In the preferred embodiment, the user can also specify the resolution desired in a preferences menu option and this resolution will be used for all copies until the user again specifies the resolution.

Figure 24:
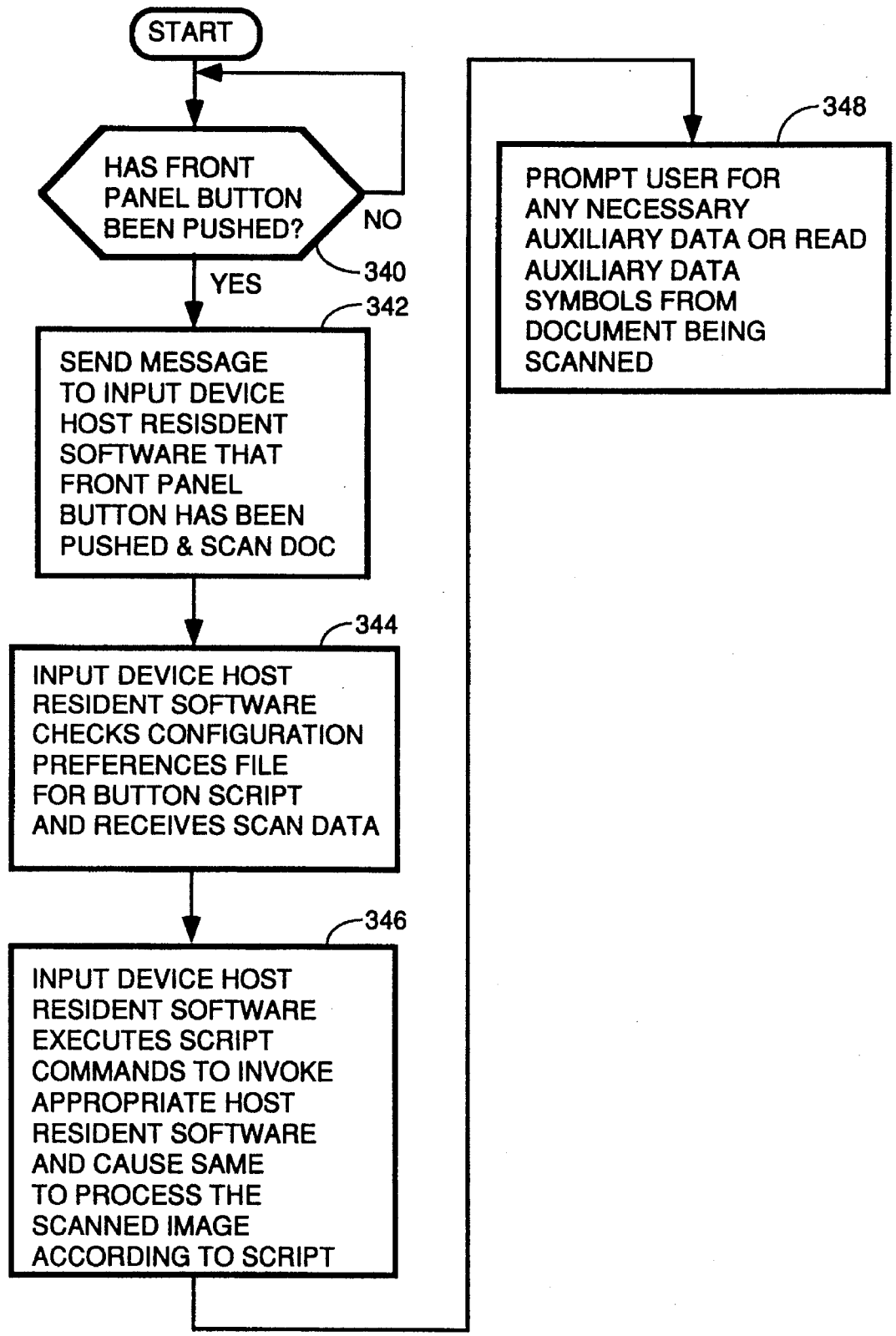
FIG. 24 is a flow chart of the processing for executing a set of scripted commands with which the front panel button on the input device has been programmed to cause predetermined processing by the host computer.

Referring to FIG. 24, there is shown a flow diagram for an alternative embodiment input device where a front panel button is scripted and causes automatic execution of the processing programmed into the button script when the button is pushed. In this embodiment, processing starts with a holding loop waiting for the front panel button 310 in FIG. 22 to be pushed, as symbolized by block 340.

After the button has been pushed, the input device software resident in the paper input device 114 of FIG. 12 scans any document which has been inserted and sends the scanned data to the host computer 110 in FIG. 12 in any of the methods described elsewhere herein. The input device software also sends a message to the input device software resident in the host computer 110 indicating that the front panel button has been pushed as symbolized by box 342. The process of scanning the document is also symbolized by box 342.

Box 344 symbolizes the process carried out by the input device resident on the host computer upon receiving the scanned pixel data and the message from the paper input device that the front panel button has been pushed. The input device software resident on the host first checks a configuration preferences file and reads the user programmed data there. This data determines the function of the front panel button and will be referred to herein as a script. The user can enter script data in the configuration preferences file which indicates what he or she wants done with the image of the scanned document For example, the user can define the front panel button as a "send this as a FAX" button or as a "insert this scanned image into drawing file XXXXX REV 2" button. It is completely up the user what script is entered, and he or she is limited only by the capabilities of the host computer, i.e., what software is loaded thereon and what auxiliary cards are loaded thereon.

After reading the script in the configuration preferences file, box 346 symbolizes the process wherein the input device host resident software executes the commands in the script file to invoke the host software necessary to carry out the desired processing. The host software so invoked then processes the image data received from the input device according to the script commands.

Box 348 symbolizes the process of prompting the user for any auxiliary data needed to process the scanned data. This auxiliary data might include the FAX number if the image is to be FAX'ed or the file name of a spreadsheet, word processing document etc. into which the image data is to be inserted etc.

Figure 25:
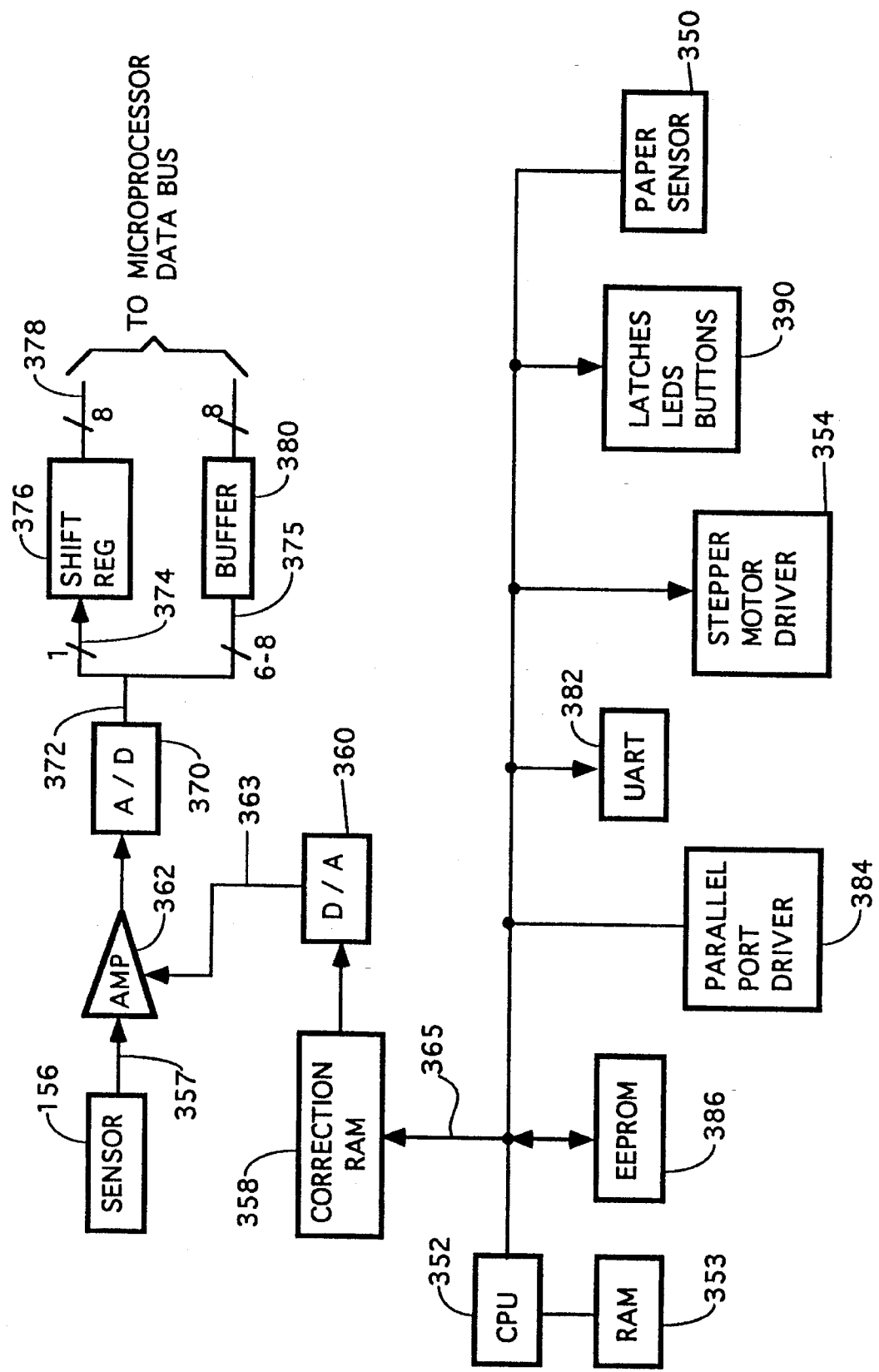
FIG. 25 is a block diagram of the electronic circuitry in the input device scanning mechanism.

Referring to FIG. 25, there is shown a block diagram of the electronics of the input device electronics of a typical embodiment in which the teachings of the passthrough technology disclosed in FIGS. 10 and 11A may be employed. The insertion of a document into the paper input device is sensed by a paper sensor 350 which can generate an interrupt to the microprocessor 352 or can be polled periodically by the microprocessor. The microprocessor, which in the preferred embodiment is a Z180, then automatically starts the scanning processing by addressing the stepper motor driver 354 and causing the stepper motor to start driving the rotors (not shown) to pull the document beneath the sensor 356. The sensor then generates a plurality of scan lines of analog gray scale pixel data. In the preferred embodiment, the sensor is a contact image sensor, but it could also be a CCD etc.

The gray scale data is preferably corrected to account for different sensitivities of the image cells in the contact image sensor. Various imaging cells of the sensor may have different sensitivities caused by manufacturing nonuniformities. This corrections is done by the combination of a correction RAM 158, a digital-to-analog converter 360 and a differential amplifier 362. Each imaging cell, i.e., pixel position, has a corresponding memory location in the sensor 356. In each memory location, a correction number is stored, a portion of which is dedicated to correcting the white level of the cell and another portion of which is dedicated to correcting the dark current. The correction numbers are converted to analog signal levels by the digital to analog converter and the resulting signals are applied via bus 363 to change the gain and reference voltages of the amplifier 362 to correct the white level and dark current level of the amplifier 362. The correction numbers are addressed sequentially via address bus 365 as the gray scale pixel value from each corresponding imaging cell is read out on bus 357 and coupled to an amplifying input of the amplifier 362.

The correction numbers stored in correction RAM 358 are also the mechanism by which changes in conversion threshold are made as described earlier to convert the gray scale data to black and white data. In other words, by moving both the white and dark current correction numbers simultaneously in the same direction, the midway point between the dark current and white current levels is also shifted in the same direction as the shift in the correction. This has the effect of changing the discrimination threshold value so that the decisions as to which gray scale pixel values are assigned to black and which are assigned to white. Of course, changes in the dark current and white level correction numbers can also be made in opposite directions to alter the dynamic range of the imaging cell. This may or may not change the discrimination threshold level depending upon the relative movement of the dark current and white level correction numbers.

After the correction (which is optional, but preferred), the gray scale pixel data is applied to the input of an analog-to-digital converter 370 where the analog pixel data is converted to, preferably, 6–8 bit gray scale data. The most significant bit of this gray scale data is stripped off the bus 372 as a one bit signal on but 374. The stream of bits on bus 374 are shifted into a serial-in-parallel-out shift register 376 until a full byte of data has accumulated. The data in shift register 376 is then output in parallel on the microprocessor data bus 378. The 6 to 8 bits of gray scale data on bus 372 are also loaded via bus 375 into a buffer 380. The single bit data on bus 374 is essentially the black and white data converted from the gray scale data assuming that the conversion threshold is midway between the dark current level and the white level since the most significant bit is used. This black and white data can then be collected by the microprocessor 352 and shipped directly to the host via a UART 382 and a serial cable (not shown) connected to the host or the black and white data can be compressed. Note that, in alternative embodiments implementing the passthrough connection to a Fax modem symbolized by the electronic block diagram of FIG. 11, another UART will be present for coupling to the Fax modem.

The black and white data is, in the embodiment symbolized by FIG. 25, sent to a conventional compression process for run length encoding etc. The compression process is carried out by microprocessor 352 on the black and white data using any known compression algorithm as described earlier stored in RAM 353 or EEPROM 386.

Alternatively, the gray scale data stored in buffer 380 can be read by the microprocessor 352, compressed and then transmitted to the host via the UART 382. Alternatively, the gray scale data can be collected from the buffer 380 and sent directly to the host without compression via the serial link and UART 382 or a high speed, parallel cable (not shown) coupled to parallel port driver 384.

The microprocessor 352 executes the compression algorithm and all the other instructions necessary for the processing described herein from RAM 353 which is loaded with the program from the input device software resident on the host computer at boot time through the parallel port driver 384. EEPROM 386, in the preferred embodiment, stores a small amount of boot code which gets the microprocessor up and running at boot time and causes it to request downloading of its program from the host.

Box 390 represents a series of latches, LEDS and front panel buttons such as button 310 in FIG. 22. The button can cause an interrupt to indicate when it is pushed or it can be periodically polled. Box 390 also represents the driver for the LED which can be turned on by the microprocessor 352 by setting a bit in one of the latches. Other bits in the latches can be set according to whatever configuration the input device is programmed to assume and whatever is the current status such "send gray scale data", "send compressed gray scale data over the parallel port", "send compressed black and white data over the serial port", "a paper has been inserted for scanning" etc.

An important characteristic of the class of paper input devices disclosed herein is the aspect of real time visual feedback to the user. When a document is inserted for scanning, the image of the scanned document immediately appears and things start to happen automatically. That is, the act of inserting the document with special symbols on it indicating the operations desired by the user controls the computer to do something. This is substantially different than the scanners in the prior art where the scanner driver must be manually invoked, the document is scanned and then other software is manually invoked to do something with the image.

Although the invention has been disclosed in terms of the preferred and alternative embodiments disclosed herein, those skilled in the art will appreciate numerous modifications and enhancements which can be made without departing from the true spirit of the invention. All such modifications and enhancements are intended to be included within the scope of the following claims.

What is claimed is:

1. A system comprising a document-driven scanning input device communicating with a computer, said input device comprising
        scanning means for generating image data representing the image of a document, and
        means, responsive to placement of a document by a user, for drawing the document into scanning relationship with said scanning means so that said scanning means generates image data representing the image of said document, wherein said placement alone is sufficient to initiate said drawing, and said computer comprising
        means for displaying, in response to said placement, a plurality of user-selectable options for processing said image data.

2. A system according to claim 1 wherein said computer further comprises means for displaying a visual representation of said image data generated in response to said placement.

3. A system according to claim 2 wherein said means for displaying displays said visual representation immediately upon generation of image data by said scanning means.

4. A system according to claim 1 wherein said computer further comprises means for establishing which option has been selected by the user and for invoking a process corresponding to the option selected by the user for processing said image data.

5. A system according to claim 1 wherein said computer further comprises
    means for displaying a visual representation of said image data generated in response to said placement, and
    means for establishing which option has been selected by the user and for invoking a process corresponding to the option selected by the user for processing said image data.

6. A system according to claim 5 wherein said means for displaying displays said visual representation immediately upon generation of image data by said scanning means.

7. A system according to any one of claims 1-6 wherein said means for drawing the document into scanning relationship with said scanning means responds to the insertion of the document into said input device by the user.

8. A system according to claim 1 wherein said means for drawing the document into scanning relationship with said scanning means sends an interrupt to said computer in response to said placement and wherein said computer displays said plurality of options in response to receiving said interrupt.

9. A system according to claim 1 wherein said means for displaying a plurality of options periodically polls said input device to determine whether a document has been placed by a user.

10. A system according to claim 1 wherein said computer further comprises means for storing said image data.

11. A system according to claim 1 wherein said input device further comprises means for storing said image data.

12. A system comprising a document-driven scanning input device communicating with a computer, said input device comprising
        scanning means for generating image data representing the image of a document, and
        means, responsive to placement of a document by a user, for drawing the document into scanning relationship with said scanning means so that said scanning means generates image data representing the image of the document, wherein said placement alone is sufficient to initiate said drawing, and
    said computer comprising
        means for displaying a visual representation of said image data generated in response to said placement.

13. A system according to claim 12 wherein said means for displaying displays said visual representation immediately upon generation of image data by said scanning means.

14. A system according to claim 12 or claim 13 wherein said means for drawing the document into scanning relationship with said scanning means responds to the insertion of the document into said input device by the user.

15. A system according to claim 12 wherein said means for drawing the document into scanning relationship with said scanning means sends an interrupt to said computer when a document is placed by a user and wherein said computer displays said visual representation in response to receiving said interrupt and said image data.

16. A system according to claim 12 wherein said means for displaying a visual representation periodically polls said input device to determine whether a document has been placed by a user.

17. A system comprising a document-driven scanning input device communicating with a computer, said input device comprising
        scanning means for generating image data representing the image of a document, and
        means, responsive to placement of a document by a user, for drawing the document into scanning relationship with said scanning means so that said scanning means generates image data representing the image of the document, wherein said placement alone is sufficient to initiate said drawing, and
    said computer comprising
        means for storing said image data generated in response to said placement.

18. A system according to claim 17 wherein said means for drawing the document into scanning relationship with said scanning means sends an interrupt to said computer in response to said placement and wherein said computer stores said image data in response to receiving said interrupt and said image data.

19. A system according to claim 17 wherein said means for storing said image data periodically polls said input device to determine whether a document has been placed by a user.

20. A document-driven system comprising a scanning input device communicating with a computer, said input device comprising
scanning means for generating image data representing the image of a document, and
means for sensing placement of a document by a user, and said computer comprising
means for displaying, in response to said placement, a plurality of user-selectable options for processing said image data, wherein said placement alone is sufficient to initiate display of said options.

21. A system according to claim 20 wherein said computer further comprises means for establishing which option has been selected by the user and for invoking a process corresponding to the option selected by the user.

22. A system according to claim 20 wherein said means for sensing responds to insertion of the document into said input device by the user.

23. A system according to claim 20 wherein said means for sensing said placement sends an interrupt to said computer in response to said placement and wherein said computer displays said plurality of options in response to receiving said interrupt.

24. A system according to claim 20 wherein said means for displaying a plurality of options periodically polls said input device to determine whether a document has been placed by a user.

25. A system according to any one of claims 20 through 24, wherein said input device further comprises means for drawing the document into scanning relationship with said scanning means in response to said placement.

26. A document-driven system comprising a document scanner, said scanner including a document sensor, and a computer, said computer communicating with said document scanner, said computer displaying, in response to the scanner sensing a document, a plurality of user-selectable options for processing image data from said scanner, wherein said placement alone is sufficient to initiate display of said options.

27. A system according to claim 26 wherein said computer establishes which option has been selected by the user and invokes a process corresponding to the option selected by the user.

28. A system according to claim 26 wherein said sensor responds to insertion of the document into said scanner.

29. A system according to claim 26 wherein said scanner sends an interrupt to said computer when the scanner senses a document and said computer displays said plurality of options in response to receiving said interrupt.

30. A system according to claim 26 wherein said computer periodically polls the scanner to determine whether the scanner has sensed a document.

31. A system according to any one of claims 26 through 30, wherein said scanner scans the document in response to sensing the document.

32. A document-driven system comprising a document scanner, said scanner, in response to placement of a document by a user, scanning the document and generating image data representing the image of the document, wherein said placement alone is sufficient to initiate said scanning and generating, and a computer, said computer communicating with said document scanner, said computer displaying, in response to said placement, a plurality of user-selectable options for processing said image data.

33. A system according to claim 32 wherein said computer also displays a visual representation of said image data generated in response to said placement.

34. A system according to claim 33 wherein said computer displays said visual representation immediately upon generation of image data by said scanner.

35. A system according to claim 32 wherein said computer establishes which option has been selected by the user and processes said image data in accordance with the option selected by the user.

36. A system according to claim 32 wherein said computer displays a visual representation of said image data generated in response to said placement, establishes which option has been selected by the user, and processes said image data in accordance with the option selected by the user.

37. A system according to claim 36 wherein said computer displays said visual representation immediately upon generation of image data by said scanner.

38. A system according to any one of claims 32-37 wherein said scanner scans in response to the insertion of the document into the scanner by the user.

39. A system according to claim 32 wherein said scanner sends an interrupt to said computer in response to said placement and wherein said computer displays said plurality of options in response to receiving said interrupt.

40. A system according to claim 32 wherein said computer periodically polls said scanner to determine whether a document has been placed by a user.

41. A system according to claim 32 wherein said computer also stores said image data.

42. A system according to claim 32 wherein said scanner includes storage for said image data.

43. A document-driven system comprising a document scanner, said scanner, in response to placement of a document by a user, scanning the document and generating image data representing the image of the document, wherein said placement alone is sufficient to initiate said scanning and generating, and a computer, said computer communicating with said document scanner, said computer displaying a visual representation of said image data generated in response to said placement.

44. A system according to claim 43 wherein said computer displays said visual representation immediately upon generation of image data by said scanner.

45. A system according to claim 43 or 44 wherein said scanner scans in response to the insertion of the document into the scanner by the user.

46. A system according to claim 43 wherein said scanner sends an interrupt to said computer when a document is placed by a user and wherein said computer displays said visual representation in response to receiving said interrupt and said image data.

47. A system according to claim 43 wherein said computer periodically polls said scanner to determine whether a document has been placed by a user.

48. A document-driven system comprising a document scanner, said scanner, in response to placement of a document by a user, scanning a document and generating image data representing the image of the document, wherein said placement alone is sufficient to initiate said scanning and generating, and a computer, said computer communicating with said document scanner, said computer storing said image data generated in response to said placement.

49. A system according to claim 48 wherein said scanner sends an interrupt to said computer in response to said placement and wherein said computer stores said image data in response to receiving said interrupt and said image data.

50. A system according to claim 48 wherein said computer periodically polls said input device to determine whether a document has been placed by a user.

UNITED STATES PATENT AND TRADEMARK OFFICE
CERTIFICATE OF CORRECTION

PATENT NO. : 5,499,108

DATED : March 12, 1996

INVENTOR(S) : Cotte, et al

It is certified that error appears in the above-identified patent and that said Letters Patent is hereby corrected as shown below:

On the title page, item [75] Inventors: "Ronald C. Fish, Morgan Hill, Calif." should be deleted.

Signed and Sealed this

Third Day of December, 1996

*Attest:*

BRUCE LEHMAN

*Attesting Officer*      *Commissioner of Patents and Trademarks*

(12) REEXAMINATION CERTIFICATE (4256th)
United States Patent
Cotte

(10) Number: US 5,499,108 C1
(45) Certificate Issued: Jan. 16, 2001

(54) DOCUMENT-DRIVEN SCANNING INPUT DEVICE COMMUNICATING WITH A COMPUTER

(75) Inventor: Pierre Cotte, Paris (FR)

(73) Assignee: Primax Electronics, Ltd., Taipei Hsien (TW)

Reexamination Request:
No. 90/004,486, Dec. 13, 1996

Reexamination Certificate for:
Patent No.: 5,499,108
Issued: Mar. 12, 1996
Appl. No.: 07/988,404
Filed: Dec. 9, 1992

Certificate of Correction issued Dec. 3, 1996.

Related U.S. Application Data

(63) Continuation-in-part of application No. 07/922,169, filed on Jul. 29, 1992.

(51) Int. Cl.[7] .............................. H04N 1/00; G05B 15/00
(52) U.S. Cl. ........................ 358/400; 358/448; 358/498; 700/76; 345/902
(58) Field of Search ...................................... 358/400, 434, 358/442, 444, 448, 474, 486, 488, 496, 498, 1.1, 1.9, 1.12, 1.14, 1.18; 382/315, 317, 319; 345/902

(56) References Cited

U.S. PATENT DOCUMENTS

| | | | |
|---|---|---|---|
| 4,034,343 | | 7/1977 | Wilmer .............................. 340/146.3 |
| 4,132,401 | | 1/1979 | Gauronski et al. .................. 271/245 |
| 5,124,800 | * | 6/1992 | Hashimoto ........................... 358/296 |
| 5,133,024 | * | 7/1992 | Froessl ..................................... 382/41 |
| 5,438,430 | | 8/1995 | MacKinlay et al. ................. 358/450 |
| 5,448,375 | | 9/1995 | Cooper et al. ....................... 358/403 |
| 5,448,685 | * | 9/1995 | Ogura et al. ......................... 395/117 |
| 5,477,238 | | 12/1995 | Aharonson et al. ................. 345/168 |
| 5,544,045 | * | 8/1996 | Garland ........................... 364/419.03 |
| 5,623,285 | | 4/1997 | Aharonson et al. ................. 345/168 |

* cited by examiner

Primary Examiner—Madeleine Anh-Vinh Nguyen

(57) ABSTRACT

An integral input/computer component combination is disclosed wherein a input device may share a single data port on the host computer with a Fax modem and be mounted to a monitor, printer, keyboard etc. so as to have a small footprint. A pair of UARTS coupled to a a microprocessor in the input device implements a passthrough connection from the port of the input device coupled to the data port of the host to a data port of the input device coupled to the Fax modem whenever the input device using scanning technology is not in use. A relay makes the same passthrough connection whenever power is turned off to the input device. In one zero footprint embodiment, the input device input device has snap-in projections which are pushed into slots formed in the computer component housing to lock the input device into place. In another embodiment, the input device and computer component are mounted together by specially adapted brackets to adjust for differences in housing dimensions between the input device and the computer component. In some embodiments, the input device and computer component share a common element such as a paper tray. In other embodiments, the input device is completely enclosed by the computer component housing. In any of these embodiments, the input device and computer component can have separate power and data lines, or, alternatively, can share power and data lines such as by having the input device derive its power from the power supply of the computer component and time division multiplexing of the data cable of said computer component. In the preferred embodiment, the software of the input device can recognize special symbols placed on the document which represents commands the user desires to give to the host computer to control its operations to process the scanned image. In the preferred embodiment, these symbols are placed on the document with different stickers, which may be different for each command or which may be universal and contain boxes the user can darken to indicate the desired command and the parameters needed by the host carry out that command. In other embodiments, the symbols may be drawn or preprinted on the document to be scanned or printed on the document by software which stores different graphic image symbols and which can print them on the document using a laser printer etc.

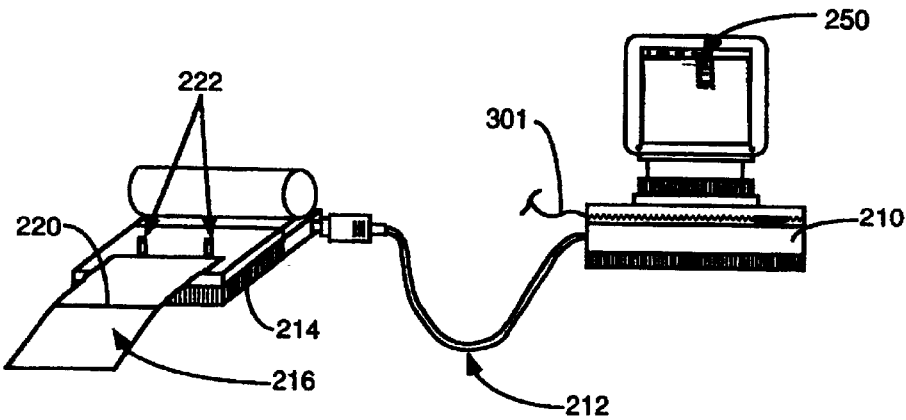

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11, 20–42 is confirmed.

Claims 12–19 and 43–50 are cancelled.

\* \* \* \* \*